US011603609B2

(12) United States Patent
Manz et al.

(10) Patent No.: US 11,603,609 B2
(45) Date of Patent: Mar. 14, 2023

(54) AUTOMATED BRAIDING MACHINE

(71) Applicant: InSource Technologies, Inc., Paulding, OH (US)

(72) Inventors: Anthony J. Manz, Paulding, OH (US); Nicolas R. Flint, Lakewood, OH (US); James L. Manz, Paulding, OH (US); Steven C. Sinn, Haviland, OH (US)

(73) Assignee: INSOURCE TECHNOLOGIES, INC., Paulding, OH (US)

( * ) Notice: Subject to any disclaimer, the term of this patent is extended or adjusted under 35 U.S.C. 154(b) by 125 days.

(21) Appl. No.: 17/212,221

(22) Filed: Mar. 25, 2021

(65) Prior Publication Data

US 2021/0301435 A1 Sep. 30, 2021

Related U.S. Application Data

(60) Provisional application No. 62/994,459, filed on Mar. 25, 2020.

(51) Int. Cl.
*D04C 3/48* (2006.01)
*D04C 3/06* (2006.01)
*D04C 3/46* (2006.01)
*B25J 15/00* (2006.01)
*B25J 9/16* (2006.01)
*B25J 11/00* (2006.01)

(52) U.S. Cl.
CPC ............... *D04C 3/48* (2013.01); *D04C 3/06* (2013.01); *B25J 9/1633* (2013.01); *B25J 9/1669* (2013.01); *B25J 11/00* (2013.01); *B25J 15/00* (2013.01); *D04C 3/46* (2013.01)

(58) Field of Classification Search
CPC .................................. D04C 3/06; D04C 3/48
See application file for complete search history.

(56) References Cited

U.S. PATENT DOCUMENTS

| 4,372,191 | A | * | 2/1983 | Iannucci | D04C 3/48 87/48 |
| 5,388,497 | A | * | 2/1995 | Akiyama | D04C 1/06 87/41 |
| 5,398,586 | A | * | 3/1995 | Akiyama | D04C 1/06 87/6 |
| 5,468,327 | A | * | 11/1995 | Pawlowicz | B29B 15/122 425/114 |
| 6,360,644 | B1 | | 3/2002 | Bettger et al. | |
| 9,863,072 | B2 | | 1/2018 | Kroczynski et al. | |
| 2013/0092013 | A1 | * | 4/2013 | Thompson | D04C 1/12 87/9 |

(Continued)

*Primary Examiner* — Shaun R Hurley
(74) *Attorney, Agent, or Firm* — Shumaker, Loop & Kendrick, LLP; James D. Miller

(57) ABSTRACT

An automated braiding machine for applying a braided cover to an elongate structure includes a barrel through which the elongate structure passes and a bobbin orbiting assembly configured to orbit a plurality of bobbins around the barrel. Each of the bobbins unwinds a corresponding thread having a portion extending between a rim of the barrel and the elongate structure. A first robotic arm assembly is configured to pull the elongate structure in a longitudinal direction thereof. A speed at which the elongate structure is pulled in the longitudinal direction thereof is dependent on a measured angle of one of the portions of the thread relative to a plane defined by the rim of the barrel.

19 Claims, 10 Drawing Sheets

(56) References Cited

U.S. PATENT DOCUMENTS

| | | | |
|---|---|---|---|
| 2016/0076178 A1* | 3/2016 | Head | D04C 3/48 87/54 |
| 2016/0183942 A1* | 6/2016 | Allen | D04C 3/40 606/228 |
| 2018/0202086 A1* | 7/2018 | Boff | D04C 3/48 |

* cited by examiner

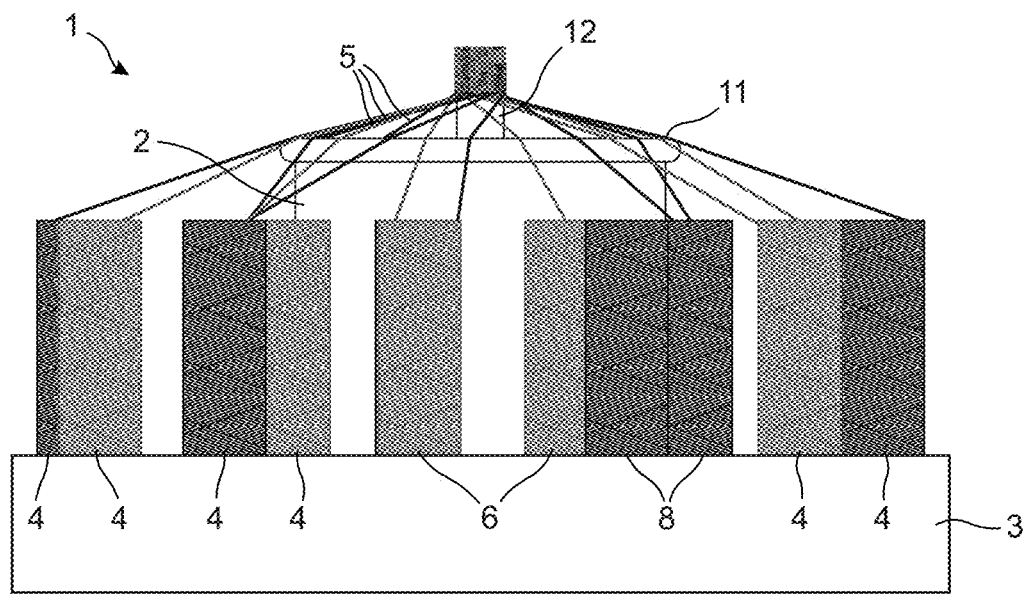
FIG. 1 - PRIOR ART
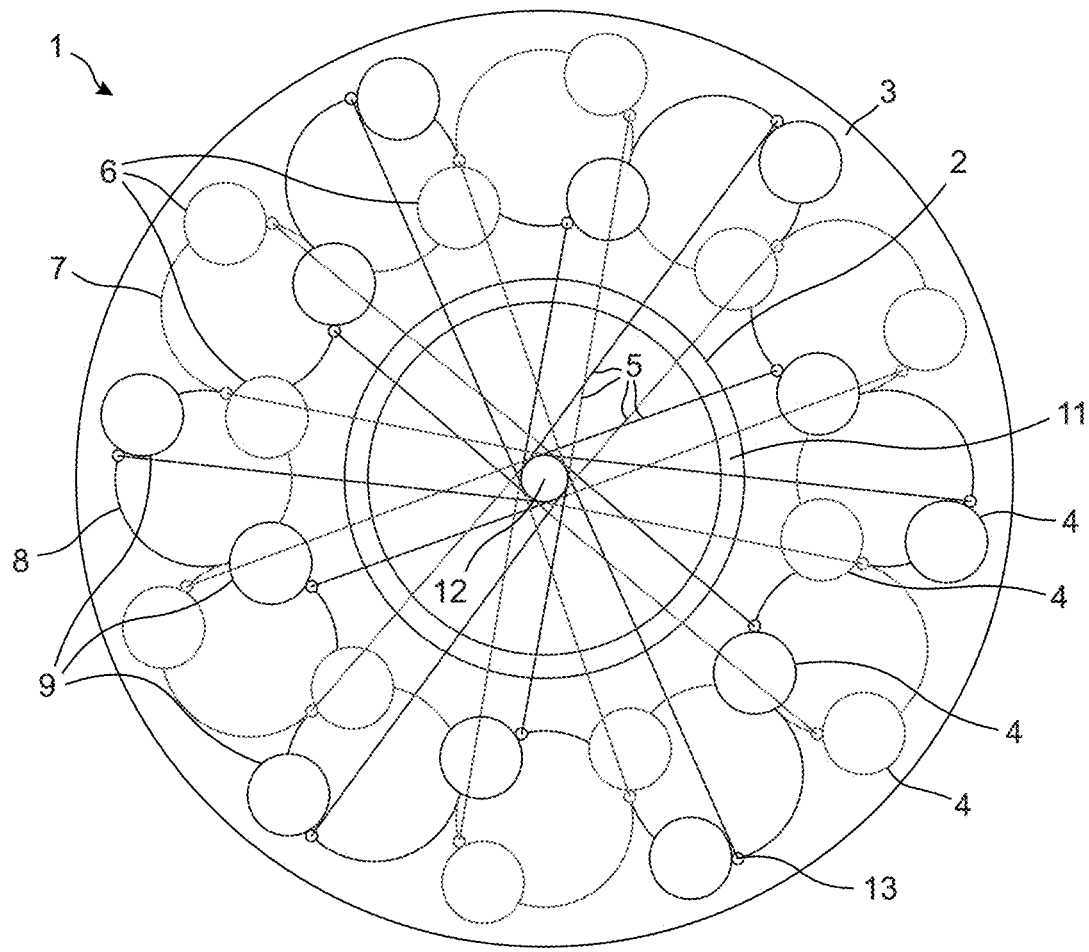
FIG. 2 - PRIOR ART

AUTOMATED BRAIDING MACHINE

CROSS-REFERENCE TO RELATED APPLICATIONS

This patent application claims priority to U.S. Provisional Patent Application Ser. No. 62/994,459, filed on Mar. 25, 2020, the entire disclosure of which is hereby incorporated herein by reference.

FIELD OF THE INVENTION

The present invention relates generally to an automated braiding machine, and more particularly, an automated braiding machine having a control system configured to provide a desired weave pattern during the automated braiding process.

BACKGROUND OF THE INVENTION

Braided harnesses have a woven cover of individual threads encasing a bundle of wires and/or cables. Such braided harnesses are typically formed using a braiding machine that weaves the threads around a trunk of the harness as the harness is pulled longitudinally through the braiding machine.

FIGS. 1 and 2 illustrate the relevant components of a manually operated braiding machine 1 of the prior art. The braiding machine 1 includes a barrel 2 through which a harness 12 is passed during the braiding thereof. The barrel 2 is surrounded by a base structure 3 having a plurality of bobbins 4 slidably mounted thereto, wherein each of the bobbins 4 has a length of a thread 5 wound thereabout. The plurality of the bobbins 4 includes a first set 6 of the bobbins 4 configured to move along a first serpentine track 7 formed in the base structure 3 and a second set 8 of the bobbins 4 configured to move along a second serpentine track 9 also formed in the base structure 3. The first and second serpentine tracks 7, 9 intersect as they pass over each other to resemble a plurality of interlinking circles. Each of the tracks 7, 9 may be formed by a slot within the base structure 3, wherein each of the slots forms a guide for prescribing the motion of the bobbins 4 as they orbit around the barrel 2. Each of the bobbins 4 includes an eyelet 13 through which the corresponding thread 5 is fed before extending towards the barrel 2 and the harness 12. The eyelets 13 of the bobbins 4 are positioned relative to a rim 11 of the barrel 2 such that each of the threads 5 is placed into contact with and is taut around the rim 11 when extending from the corresponding eyelet 13 to the outer surface of the harness 12, thereby ensuring that tension is applied to each of the threads 5 during the braiding process.

The first set 6 of the bobbins 4 is configured to orbit around the barrel 2 in a first orbiting direction (counterclockwise from the perspective of FIG. 2) while traversing the first serpentine track 7 and the second set 8 of the bobbins 4 is configured to orbit around the barrel 2 in a second orbiting direction opposite the first orbiting direction (clockwise from the perspective of FIG. 2) while traversing the second serpentine track 9. The serpentine nature of the crossing tracks 7, 9 results in each of the bobbins 4 forming the first set 6 alternatingly passing radial inward of and then radially outward of each of the bobbins 4 forming the second set 8. This alternating passage of the corresponding threads 5 of the bobbins 4 in front of and behind each other results in the formation of a weave pattern on an outer circumferential surface of the harness 12, wherein the weave pattern forms the woven cover over the trunk of the harness.

Manual operation of the braiding machine 1 includes an operator grasping a trunk of the harness 12 and pulling the harness 12 longitudinally through the barrel 2 as the first set 6 and the second set 8 of the bobbins 4 orbit in the opposing orbiting directions. It has been discovered that it is beneficial to maintain a substantially constant tension on each of the threads 5 originating from the bobbins 4 during the braiding process in order to form a consistent and desirable weave of the threads 5 around the harness 12. It has been discovered that the tension of each of the threads 5 is directly related to a thread angle A of each of the threads 5, wherein the thread angle A is the angle at which each of the threads 5 is disposed relative to a plane defined by the rim 11 of the barrel 2. The tension of each of the threads 5 is accordingly maintained at a substantially constant value by maintaining a substantially constant thread angle A during the braiding process.

The desirable thread angle A corresponds to the thread angle A at which the harness 12 has desirable coverage of the weave of the threads 5, wherein the desirable coverage includes the elimination of unnecessary gaps or overlaps present between adjacent threads 5. It has also been discovered that the thread angle A may be maintained with respect to a given circumference (diameter) of the harness 12 when the operator of the braiding machine 1 pulls the harness 12 through the barrel 2 at a substantially constant speed. This substantially constant pulling speed maintains the substantially constant tension on each of the threads 5 as they are pulled away from the rim 11 of the barrel 2 during the progression of the harness 12 through the braiding machine 1, which in turn maintains the consistency of the weave pattern.

FIGS. 3-5 illustrate three different possible outcomes that have been observed to occur during the manual braiding of an exemplary harness 12 using a manual braiding machine such as that disclosed in FIGS. 1 and 2. FIG. 3 illustrates a circumstance wherein the thread angle A is greater than is desirable, which generally corresponds to the manual operator pulling the harness 12 through the barrel 2 at a speed and tension that is too great for the threads 5 to maintain the necessary spacing therebetween on the harness 12 for the desired weave pattern and harness coverage. As can be seen in FIG. 3, the resulting weave of the threads 5 includes diamond-shaped openings or gaps between adjacent threads 5 that are indicative of poor coverage of the weave around the harness 12. In contrast, FIG. 4 illustrates an ideal circumstance wherein the manual operator has pulled the harness 12 through the barrel 2 at a speed and tension corresponding to the maintenance of the desirable thread angle A, wherein the resulting weave has ideal coverage in the absence of gaps or openings for overly exposing the exterior of the harness 12. As yet another example, FIG. 5 illustrates a circumstance wherein the manual operator has pulled the harness 12 through the barrel 2 at a speed and tension too low for maintaining the desired weave with the corresponding thread angle approaching zero, wherein the resulting weave includes overlapping sections due to the harness 12 not being pulled away from the previously formed rows of the weave quickly enough. Although not pictured, another example of improper coverage of the harness 12 may occur when one of the threads 5 is broken or otherwise missing, which leaves a repeating series of gaps within the weave of the threads 5.

It has also been discovered that the ideal pulling speed for covering the harness 12 with the desired weave pattern is dependent on the diameter and corresponding circumference of the portion of the harness 12 instantaneously being covered by the braided threads 5. As the diameter of the harness 12 decreases, it is necessary to increase the speed at which the harness 12 is pulled in order to accommodate the decreasing surface area of the harness 12 being covered for each revolution of the bobbins 4. On the contrary, as the diameter of the harness 12 increases, it is necessary to decrease the speed at which the harness 12 is pulled in order to accommodate the increasing surface area of the harness 12 in need of coverage for each revolution of the bobbins 4. As such, the speed at which the manual operator must pull the harness 12 through the braiding machine 1 in order to maintain the desired tension on the thread may vary if the size and/or shape of the harness 12 changes as the harness 12 progresses longitudinally through the braiding machine 1.

In view of the above-identified conditions, it is exceedingly difficult for a manual operator to maintain a desired weave pattern when braiding such harnesses. The manual operator must generally be very skilled and must focus his or her attention towards the coverage of the weave at all times to ensure that gaps or overlaps do not develop in the manner shown in FIGS. 3 and 5, respectively, due to the manual operator utilizing the improper pulling speed when guiding the harness 12 through the braiding machine 1.

The braiding machines of the prior art also require constant attention to the presence of branches extending away from the trunk of the corresponding harness. Prior to braiding, the harnesses are manually laid out in the desired formation and the branches are taped where they leave the main trunk. The branches are generally braided first with the braiding of each of the branches progressing from a distal end of the branch up to a position where each of the branches intersects the trunk. The main trunk is braided last with the braided branches already extending away from the main trunk. Every time a branch is encountered during the braiding process, the braiding process must be stopped and the branch must be pulled through the interweaving pattern of the individual threads. Once the branch has been pulled through, the braiding can resume along the next segment of the trunk. The existence of the branches accordingly requires the manual operator to start and stop the braiding process each time a branch is encountered. These constant changes in activity by the manual operator can be cumbersome and inefficient, and can further interrupt the braiding process repeatedly such that the consistency of the braiding process from one branch to another may not necessarily be maintained.

The manual task of pulling a harness through a traditional braiding machine is also a high-fatigue job that requires the manual operator to be hunched over the braiding machine, or which requires the operator to use his or her elbows to brace against the braiding machine. This labor-intensive job is ergonomically challenging for the manual operator. The traditional way of creating a braided harness is also a time intensive job due to the start and stop nature of the braiding process, as well as the manner in which only a single braiding machine may be addressed by the manual operator at a time.

Thus, in view of the above identified shortcomings of the prior art, there is a need for an automated braiding machine that will allow for the operator to operate multiple braiding machines simultaneously, thereby improving efficiency and decreasing labor intensity.

SUMMARY OF THE INVENTION

In concordance and agreement with the present invention, a new automated braiding machine utilizing feedback control to apply a desired weave pattern to an elongate structure has surprisingly been discovered.

According to an embodiment of the present invention, an automated braiding machine for applying a braided cover to an elongate structure includes a barrel through which the elongate structure passes and a bobbin orbiting assembly configured to orbit a plurality of bobbins around the barrel. Each of the bobbins unwinds a corresponding thread having a portion extending between a rim of the barrel and the elongate structure. A first robotic arm assembly is configured to pull the elongate structure in a longitudinal direction thereof. A speed at which the elongate structure is pulled in the longitudinal direction thereof is dependent on a measured angle of one of the portions of the thread relative to a plane defined by the rim of the barrel.

The braiding machine may further comprise a thread angle sensor assembly configured to sense the measured angle of the one of the portions of the thread relative to the plane defined by the rim of the barrel. The thread angle sensor assembly may include a first array of sensor elements spaced apart from each other with respect to the longitudinal direction of the elongate structure and a second array of sensor elements spaced apart from each other with respect to the longitudinal direction of the elongate structure, wherein the measured angle is determined based on an interference pattern of the portion of the thread with respect to energy directed between the first array of sensor elements and the second array of sensor elements.

The braiding machine may further comprise a branch detection sensor assembly disposed within an interior of the barrel. The branch detection sensor assembly is configured to detect a presence of a branch extending from the elongate structure. The first robotic arm assembly is configured to stop pulling the elongate structure in the longitudinal direction thereof following the detection of the presence of the branch. The detection of the presence of the branch is dependent on a first measured diameter of the elongate structure as sensed by the branch detection sensor assembly. The first robotic arm assembly may further comprise a first grasping mechanism configured to sense a second measured diameter of the elongate structure each time the first grasping mechanism grasps the elongate structure, wherein the detection of the presence of the branch occurs when the first measured diameter is determined to be greater than the second measured diameter. The branch detection sensor assembly may include a first array of sensor elements and an oppositely arranged second array of sensor elements, wherein the first measured diameter is determined based on an interference pattern of the elongate structure with respect to energy directed between the first array of sensor elements and the second array of sensor elements.

The braiding machine may further comprise an end detection sensor assembly disposed within an interior of the barrel. The end detection sensor assembly is configured to detect a presence of an end of the elongate structure. The first robotic arm assembly is configured to stop pulling the elongate structure in the longitudinal direction thereof following the detection of the presence of the end of the elongate structure. In some embodiments, the end detection sensor assembly and the branch detection sensor assembly may be formed by the same assembly of sensors, wherein the branch detection and end detection processes are accomplished using this single sensor assembly.

The braiding machine may further comprise a second robotic arm assembly configured to pull the elongate structure in the longitudinal direction thereof. The first robotic arm assembly and the second robotic arm assembly are configured to alternate in pulling the elongate structure in the longitudinal direction thereof. The first robotic arm assembly includes a first grasping mechanism and the second robotic arm assembly includes a second grasping mechanism, wherein the first grasping mechanism grasps the elongate structure when the first robotic arm assembly pulls the elongate structure and the second grasping mechanism grasps the elongate structure when the second robotic arm assembly pulls the elongate structure. When the first grasping mechanism pulls the elongate structure, the first grasping mechanism moves away from the barrel with respect to the longitudinal direction of the elongate structure and the second grasping mechanism moves towards the barrel with respect to the longitudinal direction of the elongate structure. When the second grasping mechanism pulls the elongate structure, the second grasping mechanism moves away from the barrel with respect to the longitudinal direction of the elongate structure and the first grasping mechanism moves towards the barrel with respect to the longitudinal direction of the elongate structure.

The first robotic arm assembly may include a first grasping mechanism configured to apply a clamping force to the elongate structure. The clamping force is proportional to a force applied by the first robotic arm assembly to the elongate structure with respect to the longitudinal direction thereof.

A method of automatically applying a braided cover to an elongate structure is also disclosed. The method includes the steps of orbiting a plurality of bobbins around a barrel with each of the bobbins unwinding a corresponding thread having a portion extending between a rim of the barrel and the elongate structure, and pulling the elongate structure in the longitudinal direction thereof using a first robotic arm assembly. The method may also include the steps of adjusting a speed at which the elongate structure is pulled in the longitudinal direction thereof based on a measured angle of one of the portions of the thread relative to a plane defined by the rim of the barrel, ceasing the orbiting of the plurality of the bobbins when a branch is detected as extending from the elongate structure, and ceasing the orbiting of the plurality of the bobbins when an end of the elongate structure is detected.

BRIEF DESCRIPTION OF THE DRAWINGS

The above-mentioned, and other features and objects of the inventions, and the manner of attaining them will become more apparent and the invention itself will be better understood by reference to the following description of the embodiment of the invention taken in conjunction with the accompanying drawings, wherein:

FIG. 1 is a side elevational view of a braiding machine according to the prior art;

FIG. 2 is a top plan view of the braiding machine of FIG. 1;

WRITTEN DESCRIPTION OF THE INVENTION

Figure 3:
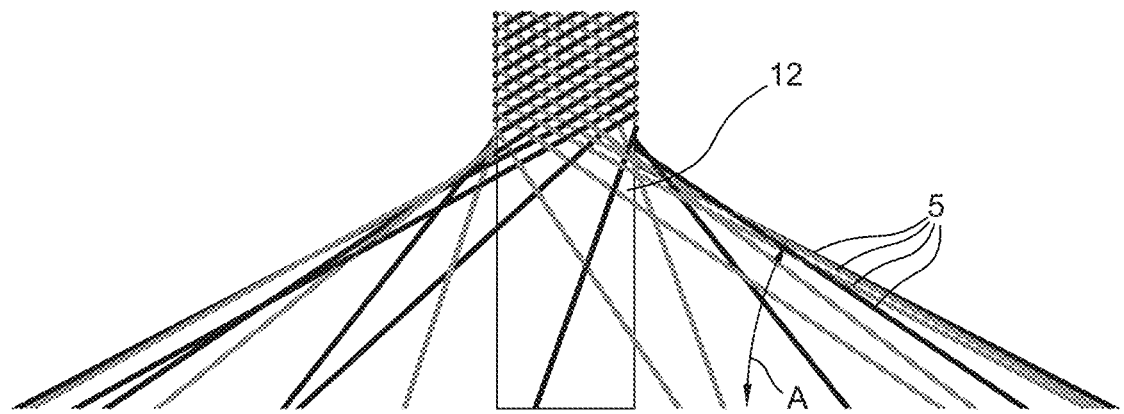
FIG. 3 is a fragmentary side elevational view of a portion of a braiding machine showing a thread angle that is greater than desired for producing a desired weave pattern on an associated harness during the braiding process.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 6-15 illustrate a braiding machine 10 according to an embodiment of the present invention. The braiding machine 10 differs from those of the prior art in that the braiding machine 10 is configured to be interchangeably operable in either of a manual mode of operation or an automated mode of operation. The inclusion of the automated mode of operation in the braiding machine 10 allows a single human operator to operate a plurality of the braiding machines 10 simultaneously. The automated mode of operation also facilitates the formation of an ideal weave pattern within the resulting cover having a desirable configuration and coverage, and further addresses ergonomic challenges normally faced by a human operator when performing a braiding process.

The braiding machine 10 is typically configured for the braiding of a bundle of cables or wires which may commonly be referred to as a cable harness, wire harness, or wiring harness. Each of the harnesses described hereinafter includes a trunk and may optionally include at least one branch extending away from the trunk. The trunk forms a central and longitudinally extending structure of the harness. The trunk of the harness may normally be substantially flexible and subject to bending in any radial direction arranged perpendicular to the central axis of the trunk. However, as used herein, it is assumed that the trunk is extended longitudinally during passage of the harness through the braiding machine 10 such that the trunk is devoid of significant bends or curves therein during the braiding process. Additionally, references hereinafter to the longitudinal direction or axial direction of the harness or the trunk thereof refer to the longitudinal direction or axial direction of the harness or the trunk thereof when extended through the braiding machine 10 in the rectilinear configuration shown in FIGS. 11 and 13-15. References to the radial direction of the harness or the trunk thereof refer to those directions originating from the central axis of the trunk and extending perpendicular to the axial or longitudinal direction of the trunk during the passage of the harness through the braiding machine 10. Lastly, the longitudinal direction of the harness or the trunk thereof may alternatively be referred to as the direction of passage of the harness or the trunk thereof through the braiding machine 10, as the two coincide during operation of the braiding machine 10.

The trunk of the harness may be substantially cylindrical in shape when the harness is extended longitudinally for passage through the braiding machine 10. However, the trunk is not limited to a generally circular perimeter shape, and may include other perimeter shapes so long as the perimeter shape utilized is capable of being suitably covered with a weave of thread as produced by the braiding of the braiding machine 10. The perimeter shape of the trunk may be substantially constant or may vary along the length of the harness. Similarly, a diameter of the trunk may be substantially constant or may vary along the length of the harness.

Each of the branches of the harness may refer to a segment of bundled wires that extends away from the trunk with respect to a radial direction of the harness. It is assumed hereinafter that the branches are not themselves in need of braiding during the passage of the harness through the braiding machine 10. The branches may be braided separately prior to the braiding of the trunk of the harness, such as by braiding each of the branches from a distal end thereof up to a position wherein each of the branches intersects the trunk. However, each of the branches may be formed by any structure branching radially away from the centrally located trunk, and may or may not have any type of covering or braiding applied thereto, while remaining within the scope of the present invention. Each of the branches extending from the trunk may be spaced from other adjacent branches with respect to the circumferential direction of the trunk, the axial direction of the trunk, or combinations thereof, as desired. The branches may be separated from each other by longitudinally extending segments of the trunk.

Although the braiding machine 10 is disclosed hereinafter as being suitable for the braiding of a woven cover over the described harness, it should be readily apparent to one skilled in the art that the braiding machine 10 may be suitable for the braiding of a cover over any elongate structure or component having an exposed outer circumferential surface, as desired, while remaining within the scope of the present invention. As such, the method of braiding the harness as described hereinafter may similarly be applied to any such elongate structure in need of a braided cover, hence further references hereinafter to the automated braiding of the harness also apply to the automated braiding of any suitable elongate structure. The elongate structure may further include radially extending branches in similar fashion to the harnesses shown in the accompanying figures.

The braiding machine 10 is described throughout as having a plurality of threads that are intertwined to form the braided weave pattern on the trunk of the harness that forms a woven or braided cover over the trunk of the harness. The threads may be formed from polymeric materials such as Nomex® (a synthetic fiber), nylon, engineered yarns, or PEEK (polyetheretherketone), as non-limiting examples. The threads may also be provided as thin wires or the like formed from metallic materials, such as stainless steel. Each of the threads may be formed from substantially any material having the requisite strength and flexibility to deform to the shapes and configurations contemplated herein, including the corresponding thread being configured to bend around any surfaces of the braiding machine 10 or the harness during the braiding of the harness. Each of the threads may include any suitable cross-sectional shape and size for forming the desired weave pattern on the harness, so long as the length of each of the threads is many orders of magnitude greater than a nominal diameter thereof.

The braiding machine 10 is also shown and described hereinafter as pulling the harness therethrough with the harness arranged longitudinally in the vertical direction. However, it should be readily apparent to one skilled in the art that the apparatuses and processes described herein may be adapted for the pulling of the harness (or an analogous elongate structure) at substantially any desired orientation while still applying the braided weave in a desired configuration. For example, the entirety of the disclosed braiding machine 10 may be rotated 90 degrees about a horizontally extending axis to cause the harness to be pulled therethrough in a horizontal direction while operating in the same manner as described hereinafter, so long as the effects of gravity are accounted for in reorienting the braiding machine 10 and supporting the harness at the horizontal orientation. The same control methods and systems may be applied when using the braiding machine 10 with respect to substantially any orientation thereof.

Figure 6:
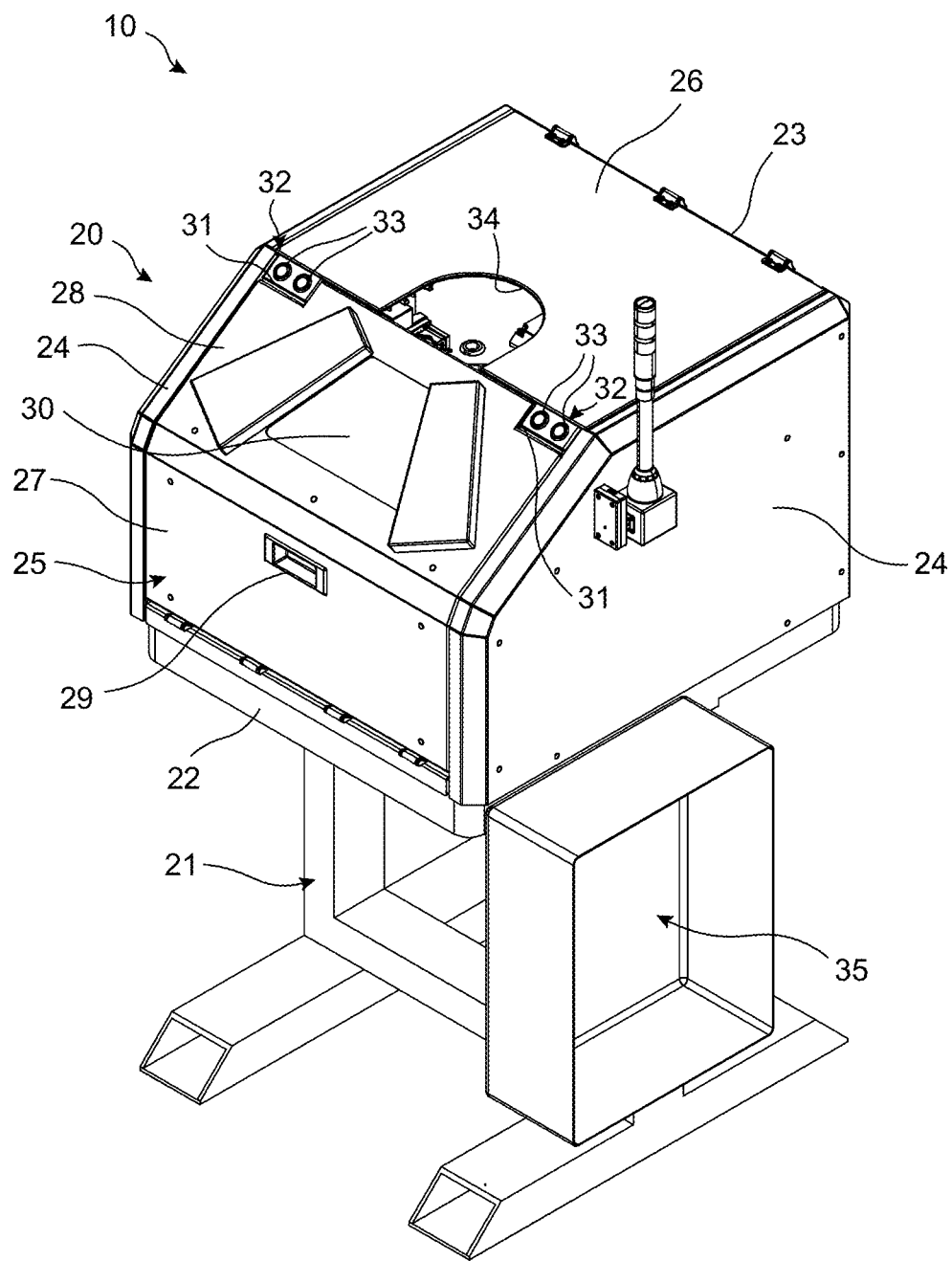
FIG. 6 is a front perspective view of a braiding machine according to an embodiment of the present invention, wherein the braiding machine is depicted when in an operational configuration thereof.

Referring now to FIG. 6, the machine includes an encasement 20 for supporting and enclosing various components of the braiding machine 10. The encasement 20 is shown in FIG. 6 as being adjusted to an operational configuration thereof corresponding to the braiding machine 10 operating in either of the manual mode of operation or the automated mode of operation thereof. The encasement 20 includes a support frame 21, a bottom wall 22, a rear wall 23, a pair of side walls 24, a front cover 25, and a top cover 26. The support frame 21 is disposed on a ground surface and supports the bottom wall 22, which is arranged horizontally in parallel to the ground surface. The rear wall 23 extends upwardly from a rear side of the bottom wall 22. The side walls 24 extend upwardly from opposing sides of the bottom wall 22 with the side walls 24 intersecting opposing ends of the rear wall 23.

The front cover 25 is pivotally coupled to the bottom wall 22 at a front side thereof while the top cover 26 is pivotally coupled to the rear wall 23 at an upper end thereof. The front cover 25 is divided into a vertical segment 27 and an angled segment 28 to match the right-trapezoidal shape of each of the side walls 24 disposed to either side of the front cover 25. The vertical segment 27 may include a handle 29 for grasping the front cover 25 and the angled segment 28 may include a window 30 for viewing the braiding process occurring within an interior of the encasement 20.

Figure 7:
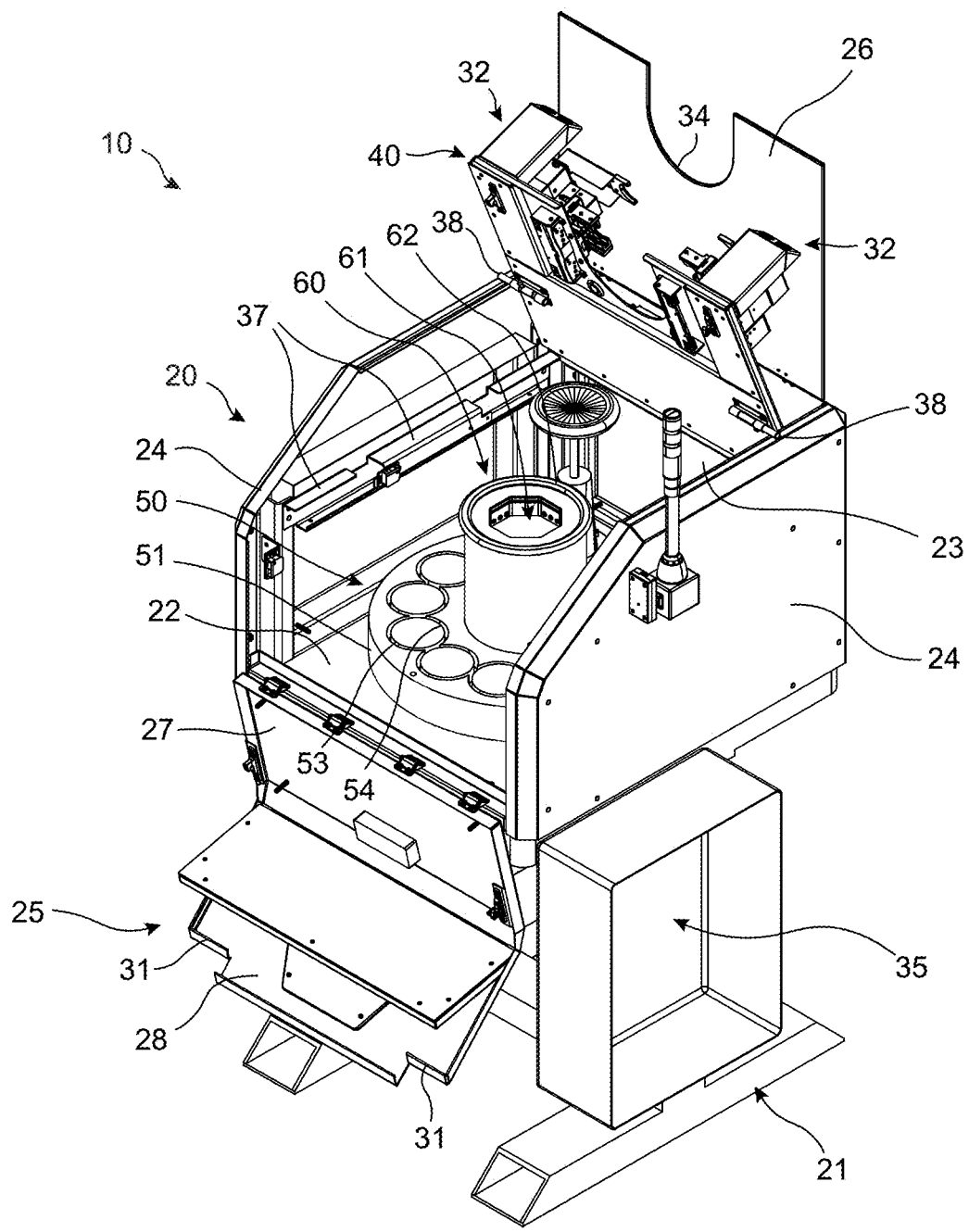
FIG. 7 is a front perspective view of the braiding machine of FIG. 6 when in a maintenance configuration thereof.

The angled segment 28 is shown as including a pair of cutouts 31 formed in opposing corners of the angled segment 28 spaced apart from the vertical segment 27 of the front cover 25. Each of the cutouts 31 forms an opening for a user interface 32 to extend through the front cover 25 for access to an operator of the braiding machine 10. Each of the user interfaces 32 includes a pair of buttons 33, wherein each of the buttons 33 is associated with operating the braiding machine 10 in the automated mode of operation thereof. The buttons 33 and their respective uses are described in greater detail hereinafter when describing a method of operation of the braiding machine 10. However, it should be apparent that any number and types of user interfaces may be utilized in controlling the braiding machine 10 while remaining within the scope of the present invention, hence the braiding machine 10 is not limited to the use of the four buttons 33 as shown in FIGS. 6 and 7. Any user interface capable of interacting with the braiding machine 10 and causing the braiding machine 10 to perform the tasks described hereinafter may be utilized while remaining within the scope of the present invention.

The top cover 26 includes an opening 34 formed therein along an edge of the top cover 26 disposed adjacent the cutouts 31 when the covers 25, 26 are each in the closed configuration shown in FIG. 6. The opening 34 presents a space through which the harness can extend upwardly following the braiding process occurring within the encasement 20. The opening 34 also allows for a human operator of the braiding machine 10 to access an interior of the encasement 20 from above during operation of the braiding machine 10.

Each of the disclosed walls 22, 23, 24 and/or covers 25, 26 may include sound absorption features for reducing the sound generated by the braiding machine 10 during operation thereof. For example, each of the walls 22, 23, 24 and/or covers 25, 26 may be configured to accept panels thereover that include sound reducing materials or configurations, such as panels formed from plastic sheets, foam insulation, or a plate having a sound interference pattern of holes formed therethrough, as non-limiting examples. The walls 22, 23, 24 and/or covers 25, 26 may also be configured to be removably replaceable with such panels or features, as desired.

Referring now to FIG. 7, the encasement 20 is also configured for adjustment to a maintenance configuration wherein a human operator can access the components of the braiding machine 10 disposed within the interior of the encasement 20 for performing routine maintenance thereon, such as lubricating the components of the braiding machine 10. The maintenance configuration includes the front cover 25 pivoted downwardly about the front edge of the bottom wall 22, which may be facilitated by the grasping and pulling of the handle 29. The maintenance configuration further include the top cover 26 pivoted upwardly about the upper edge of the rear wall 23, which may be facilitated by grasping the top cover 26 along an edge thereof defining the opening 34.

The braiding machine 10 further includes a table 40 supporting various components of the braiding machine 10. The table 40 is a substantially planar and plate-like structure configured to rest on ledges 37 extending horizontally inwardly from the side walls 24 of the encasement 20 when the encasement 20 is in the operational position shown in FIG. 6. The table 40 may be configured to rest on the ledges 37 at a height above the bottom wall 22 corresponding to a height at which the division occurs in the front cover 25 from the vertical segment 27 to the angled segment 28 thereof. The table 40 may also be pivotally coupled to the rear wall 23 at the same height as the ledges 37 relative to the bottom wall 22. The maintenance configuration of the encasement 20 may optionally include the table 40 pivoted upwardly towards the rear wall 23 until a pair of latch bolts 38 coupled to an underside of the table 40 are disposed above an upper edge of each of the side walls 24. Each of the latch bolts 38 is configured to selectively slide laterally outwardly to a position wherein at least a portion of each of the latch bolts 38 is disposed over the upper edge of the corresponding side wall 24, thereby allowing for the table 40 to rest on the side walls 24 when a human operator desires to access the portions of the braiding machine 10 disposed beneath the table 40.

The bottom wall 22 of the encasement 20 supports a bobbin orbiting assembly 50 and a barrel 60 of the braiding machine 10. Although not pictured, the bottom wall 22 includes an opening formed therethrough for passing the harness into and through the barrel 60 from a position beneath the bottom wall 22. The bobbin orbiting assembly 50 includes a base structure 51 that similarly includes an opening (not shown) formed therethrough in alignment and communication with the opening formed through the bottom wall 22. The harness may accordingly pass through the opening of the bottom wall 22 and the opening of the base structure 51 before entering a hollow interior 61 of the barrel 60. Alternatively, the bottom wall 22 and the base structure 51 may be formed from a single structure, as desired.

Figure 13:
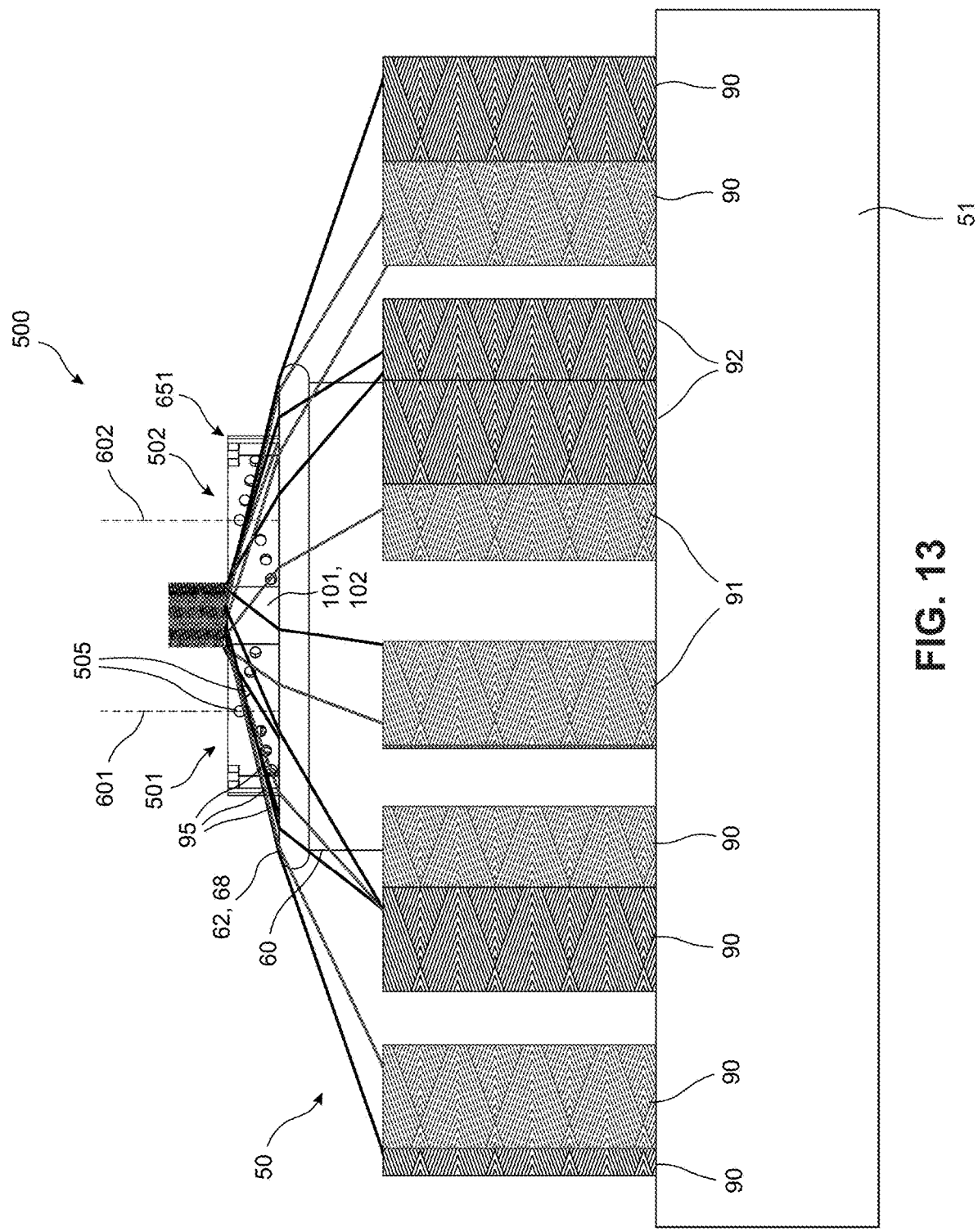
FIG. 13 is a fragmentary side elevational view showing the thread angle sensor assembly, the barrel, and a bobbin orbiting assembly in isolation for illustrating the method of operation of the thread angle sensor assembly.
Figure 14:
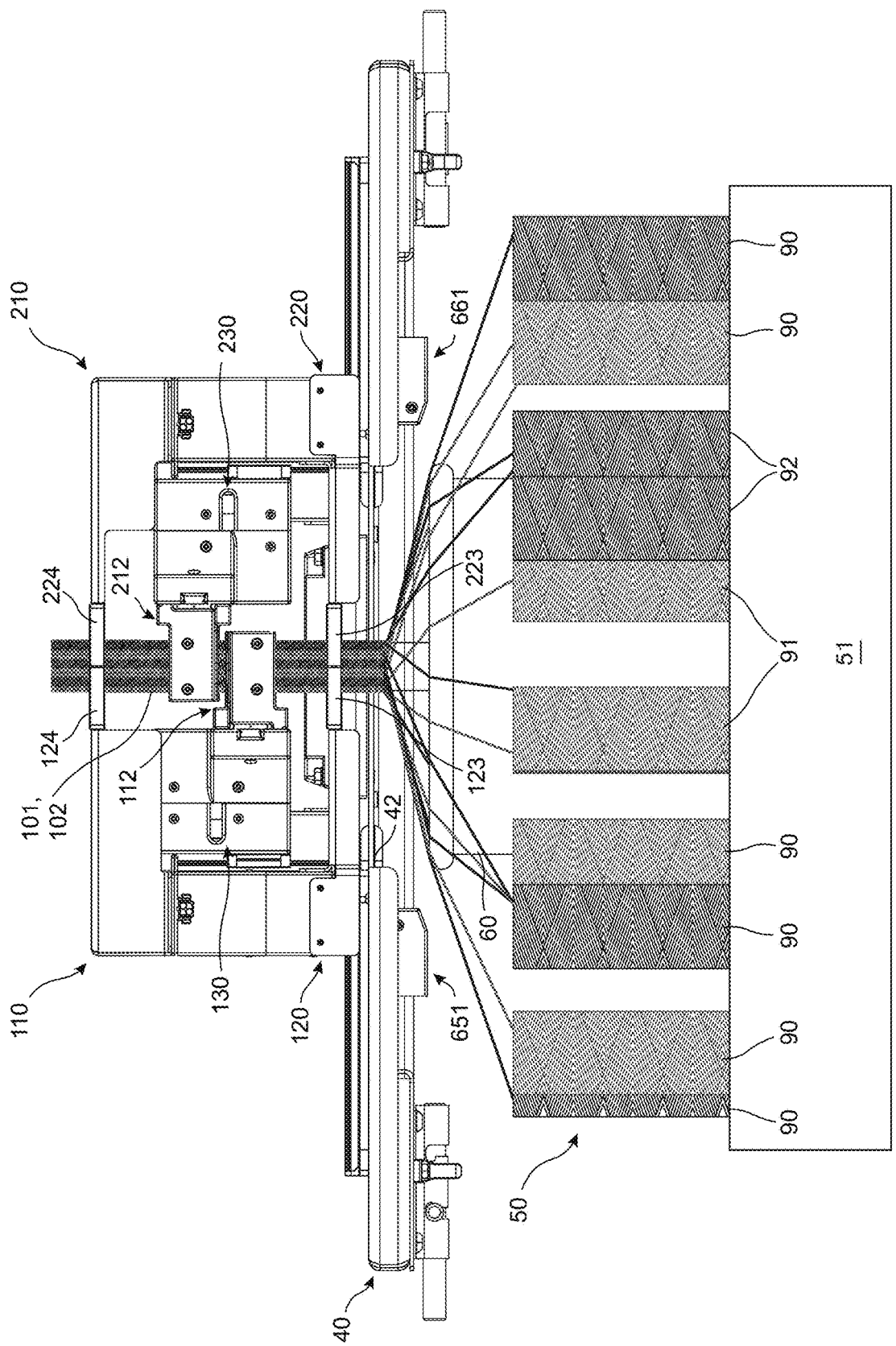
FIG. 14 is a fragmentary side elevational view showing a table, a first robotic arm assembly, a second robotic arm assembly, a barrel, and a bobbin orbiting assembly in isolation, wherein the grasping mechanisms of the first and second robotic arm assemblies are positioned in a proximate configuration thereof.
Figure 15:
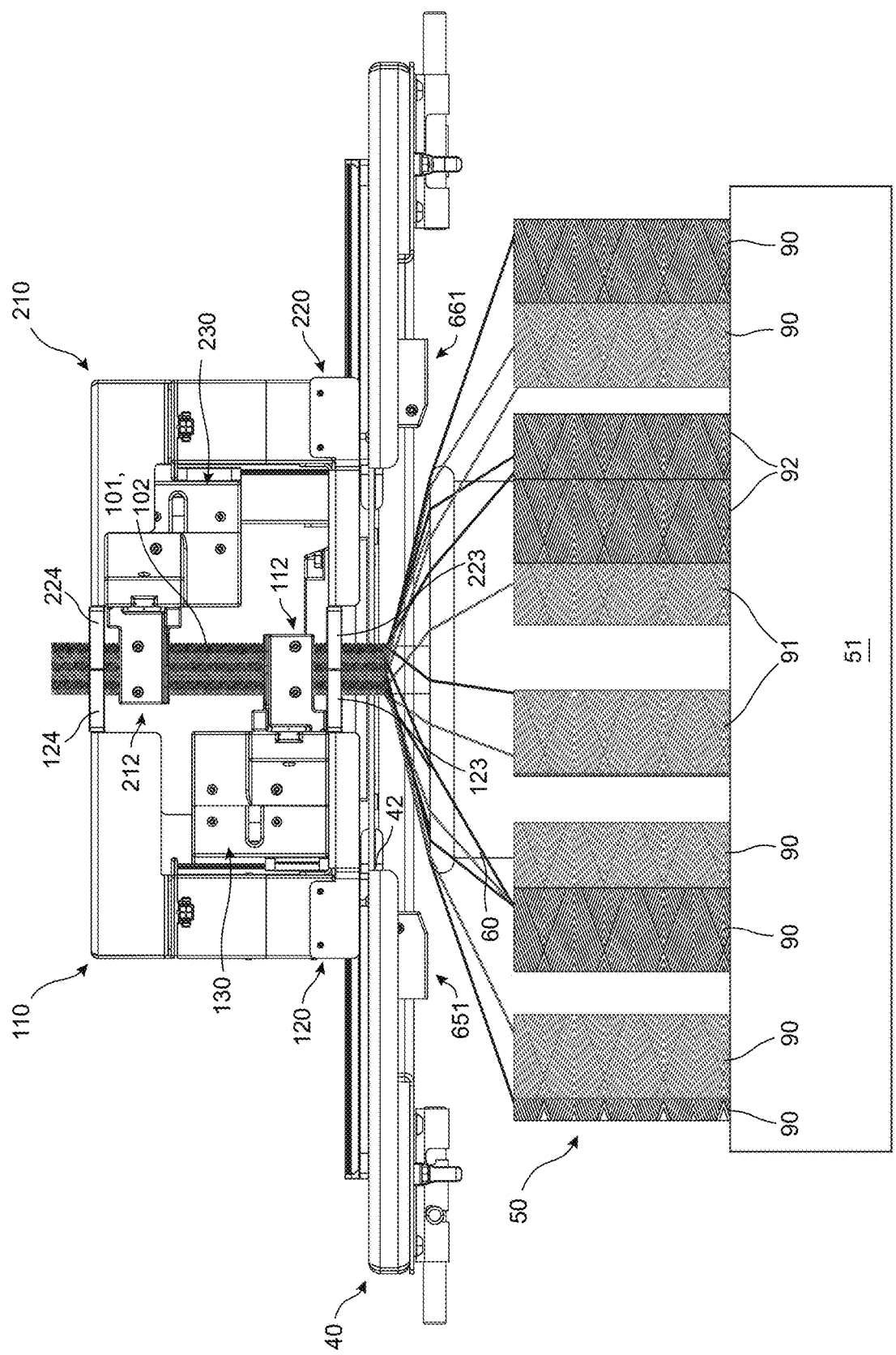
FIG. 15 is a fragmentary side elevational view showing wherein the grasping mechanisms of FIG. 14 are positioned in a distant configuration thereof.

The bobbin orbiting assembly 50 is configured to orbit a plurality of bobbins 90 around the barrel 60, which are illustrated in FIGS. 13-15 while showing methods of operation of the braiding machine 10. More particularly, the plurality of the bobbins 90 includes a first set 91 of the bobbins 90 configured to orbit around the barrel 60 in a first orbiting direction and a second set 92 of the bobbins 90 configured to orbit around the barrel in a second orbiting direction arranged opposite the first orbiting direction. In the illustrated example, the first set 91 of the bobbins 90 is configured to traverse a first serpentine track 53 formed in the base structure 51 and extending around the barrel 60 while the second set 92 of the bobbins 90 is configured to traverse a second serpentine track 54 similarly formed in the base structure 51 and extending around the barrel 60. The serpentine tracks 53, 54 are disposed radially outwardly of the barrel 60 and cross over each other in the radial direction of the barrel 60 to facilitate the bobbins 90 of the first set 91 repeatedly passing radially inwardly and then radially outwardly of the bobbins 90 of the second set 92 when the first and second sets 91, 92 of the bobbins 90 are orbited around the barrel 60 in the opposing orbiting directions. This in-and-out motion of the opposing sets 91, 92 of the bobbins 90 forms the weave pattern shown throughout the accompanying figures where oppositely sloped threads are alternatingly passed in front and behind each other. The manner in which the sets 91, 92 of the bobbins 90 orbit around the barrel 60 may be better understood by review of FIGS. 1 and 2, which illustrate a braiding machine 1 utilizing the same bobbin orbiting assembly as the bobbin orbiting assembly 50.

Each of the bobbins 90 includes a thread 95 wound thereabout for use in the braiding process. The thread 95 of each of the bobbins 90 may be fed through at least one eyelet (not shown) to redirect the unwinding thread 95 radially inwardly towards the barrel 60. Each of the threads 95 is tensioned over a rim 62 of the barrel 60, which is disposed at a height above the position of the bobbins 90 and the corresponding eyelets. Each of the threads 95 then extends away from the rim 62 in the radial inward direction over a hollow interior 61 of the barrel 60 and towards the harness instantaneously being covered by the weave pattern. As explained hereinabove with reference to FIGS. 3-5, the thread angle of each of the threads 95 refers to the angle at which the corresponding thread 95 is angled relative to a plane defined by the rim 62 of the barrel 60 along the portion of each of the threads 95 extending between the rim 62 and the harness being covered.

Although not pictured, each of the bobbins 90 may be associated with a thread tension sensor. Each of the thread tension sensors may be in the form of a hall-effect sensor or a mechanical switch configured to detect when the tension in the thread 95 in a corresponding one of the bobbins 90 is less than a desired tension selected for each of the threads 95. For example, if hall-effect sensors are utilized, each of the hall-effect sensors may be disposed on the base structure 51 with each of the hall-effect sensors fixed in position relative to the orbiting bobbins 90. The hall-effect sensors may include a first hall-effect sensor disposed adjacent the first track 53 and associated with sensing the first set 91 of the bobbins 90 and a second hall-effect sensor disposed adjacent the second track 54 and associated with sensing the second set 92 of the bobbins 90. Each of the bobbins 90 may include the thread 95 thereof extending away from the wound portion of the corresponding bobbin 90 through an eyelet disposed adjacent an upper portion of the corresponding bobbin 90, down to a spring-loaded arm towards a middle or bottom portion of the corresponding bobbin 90, and then back upwards to another eyelet disposed above the wound portion of the corresponding bobbin 90. If the corresponding thread 95 runs out, is broken, or for whatever reason does not have enough tension applied thereto, the spring-loaded arm is configured to readjust, such as by moving downwardly, due to the urging of the corresponding spring mechanism. The readjustment of each of these spring-loaded arms may then be sensed by the aforementioned first and second hall-effect sensors. Each of the hall-effect sensors is configured to only detect the presence of one of the spring-loaded arms when the tension in the corresponding thread 95 has decreased below a predetermined value, which corresponds to the spring-loaded arm being urged towards a configuration wherein the corresponding one of the hall-effect sensors can sense the readjustment of the spring-loaded arm when passing thereby. A similar effect may be achieved using a mechanical switch having the same biasing properties for interacting with the passing bobbins 90, as desired.

The bobbin orbiting assembly 50 may be driven by any suitable actuator. The bobbin orbiting assembly 50 may also include any suitable mechanical assembly for transferring the power generated by the actuator to the orbiting motion of the two different sets 91, 92 of the bobbins 90. The bobbins 90 are also not limited to moving along prescribed tracks 53, 54 formed within a base structure 51, as any mechanism capable of orbiting the different sets 91, 92 of the bobbins 90 in the opposing orbiting directions may be utilized while remaining within the scope of the present invention, so long as the bobbins 90 of each of the sets 91, 92 follow the prescribed pathways while maintaining the tension of each of the threads 95 when extending over and contacting the rim 62 of the barrel 60.

The braiding machine 10 may further include a control box 35 coupled to the support frame 21. Although not pictured, the control box 35 may include additional buttons, controls, switches, knobs, or other user interfaces associated with the operation of the braiding machine 10 in the manual mode of operation thereof. For example, the control box 35 may include control means related to the manual starting of the bobbin orbiting assembly 50 for causing the bobbins 90 to begin their orbits, the manual stopping of the bobbin orbiting assembly 50 to stop the orbiting of the bobbins 90, the adjusting of the rate at which the bobbins 90 are caused to orbit around the barrel 60, the activation of a foot pedal mode for controlling the bobbin orbiting assembly 50 using a foot pedal (not shown) in communication with the control box 35, or the initiation of an emergency stop to promptly cease operation of the braiding machine 10, as non-limiting examples.

The braiding machine 10 includes a control system in signal communication with each relevant component and mechanism of the braiding machine 10 responsible for performing the automated mode of operation thereof. The control system may represent any computational device having a memory, a processor, one or more communication protocols, and one or more instruction sets, wherein the control system is configured for sending and receiving control signals, and in some circumstances for analyzing data associated with such control signals and making determinations based on such data. The control system may include multiple different computational devices in signal communication with each other. In general, the control system may represent any computational device or system of computational devices capable of carrying out the automated processes described hereinafter. Unless noted as being performed manually by the human operator, it is also assumed hereinafter that all actions stated as being performed by the braiding machine 10 or by any mechanism or system of the braiding machine 10 occur automatically under the control of the control system once such a process is initiated by the human operator. More specifically, it is assumed that each sensed or measured condition of the braiding machine 10 or the threads 95 as described hereinafter is communicated to the control system, and that each action of one of the mechanisms or systems of the braiding machine 10 that occurs in reaction to such sensed conditions is related to the reception of a control signal sent by the control system and received by the corresponding mechanism or system.

The control system may also be in communication with or may be responsible for the actions described hereinabove as being performed using the control box 35 during the manual mode of operation of the braiding machine 10. For example, the control system may be configured to interrupt communication between certain controls of the control box 35 and the bobbin orbiting assembly 50 when the automated mode of operation has been initiated, thereby preventing the manual operator from selecting one of the manual operation controls that may be contradictory to the prescribed actions of the braiding machine 10 during the automated mode of operation. Some controls associated with the control box 35 may be common to the manual mode of operation and the automated mode of operation. For example, a control mechanism for determining the orbiting speed of the bobbins 90 may remain active during either of the manual mode of operation or the automated mode of operation to allow for manual changes to the orbiting speed in either mode of operation, while other actions of the braiding machine 10 may remain automated. The control system may also maintain the ability of an emergency off switch to be activated with respect to either of the manual mode of operation or the automated mode of operation.

Figure 8:
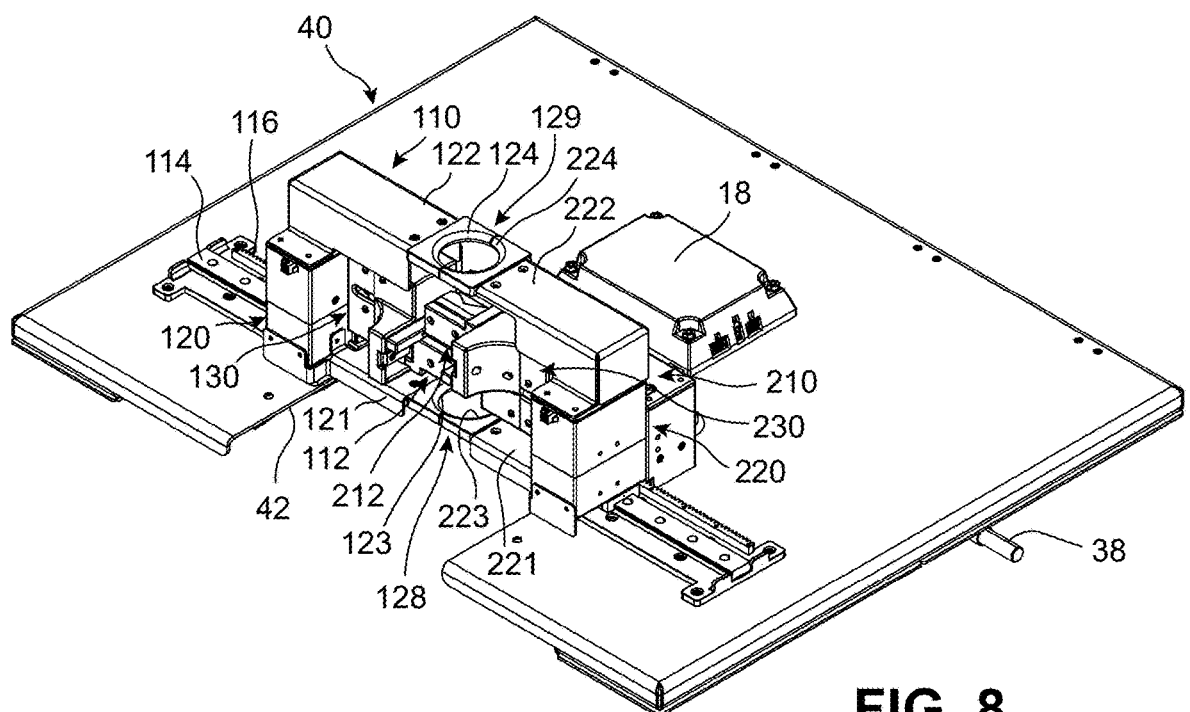
FIG. 8 is a front perspective view showing a table of the braiding machine of FIGS. 6 and 7 in isolation, wherein the table is shown as supporting a first robotic arm assembly and a second robotic arm assembly.

Referring now to FIG. 8, the table 40 is shown in isolation with the user interfaces 32 thereof removed for clearly illustrating the remaining components supported on the table 40. The table 40 includes an opening 42 formed therethrough. The opening 42 may include substantially the same configuration as the opening 34 formed in the top cover 26. The opening 42 is positioned to be in alignment and to cooperate with the opening formed through the bottom wall 22, the opening formed through the base structure 51, the hollow interior 61 of the barrel 60, and the opening 34 of the top cover 26 in forming a continuous open space through the braiding machine 10 through which the harness may pass longitudinally.

The table 40 is also shown as having a controller 18 disposed thereon, wherein the controller 18 may form at least a portion of the previously described control system of the braiding machine 10. However, the control system may be positioned anywhere relative to the braiding machine 10 without departing from the scope of the present invention, so long as the resulting control system is able to send and receive the necessary control signals in the manner described hereinafter. The control system may be in communication with each of the described mechanisms and systems using direct connection communication or wireless communication, as desired.

The table 40 supports a first robotic arm assembly 110 disposed to a first side of the opening 42 and a second robotic arm assembly 210 disposed to a second side of the opening 42. The first robotic arm assembly 110 includes a first grasping mechanism 112 as an end tool thereof and the second robotic arm assembly 210 includes a second grasping mechanism 212 as an end tool thereof. Each respective grasping mechanism 112, 212 is configured to selectively grasp a portion of the trunk of the harness that has recently been covered with the braided weave during the automated mode of operation of the braiding machine 10. As used herein, grasping the covered portion of the trunk means applying a clamping force to the covered portion of the trunk in opposing radial directions of the harness sufficient to pull the harness through the braiding machine 10 during the braiding process without incurring slipping between the corresponding grasping mechanism 112, 212 and the covered portion of the trunk.

The first robotic arm assembly 110 is configured to translate the first grasping mechanism 112 in a first radial direction of the harness between a retracted position wherein the first grasping mechanism 112 is spaced apart from a central axis of the trunk and an extended position wherein the first grasping mechanism 112 surrounds the central axis of the trunk with the first grasping mechanism 112 positioned to selectively grasp the trunk. Similarly, the second robotic arm assembly 210 is configured to translate the second grasping mechanism 212 in a second radial direction of the harness between a retracted position wherein the second grasping mechanism 212 is spaced apart from a central axis of the trunk and an extended position wherein the second grasping mechanism 212 surrounds the central axis of the trunk with the second grasping mechanism 212 positioned to selectively grasp the trunk. In the present example, the first and second radial directions of translation of the robotic arm assembles 110, 210 are diametrically opposed to each other to cause the first and second grasping mechanisms 112, 212 to approach the trunk from opposing directions. However, the first and second grasping mechanisms 112, 212 may approach the trunk from any two different radial directions, so long as the grasping mechanisms 112, 212 and/or the remainder of the robotic arm assemblies 110, 210 do not interfere with each other during the radial extension and retraction processes. In the present example, each of the radial directions represents a horizontal direction arranged parallel to the supporting surface of the table 40 and the underlying ground surface supporting the braiding machine 10.

The first robotic arm assembly 110 is also configured to translate the first grasping mechanism 112 in the longitudinal (axial) direction of the trunk of the harness once the first grasping mechanism 112 has been translated radially inwardly to the extended position thereof, wherein the longitudinal direction of the trunk also corresponds to the direction of passage of the harness through the barrel 60. Similarly, the second robotic arm assembly 210 is configured to translate the second grasping mechanism 212 in the longitudinal (axial) direction of the trunk of the harness once the second grasping mechanism 212 has been translated radially inwardly to the extended position thereof. In the present example, the longitudinal direction of the trunk and the direction of travel of the harness through the barrel 60 each represent a vertical direction parallel to the direction of gravity.

The first robotic arm assembly 110 of the present example includes a guide structure 114 coupled to an upper surface of the table 40, a carriage assembly 120 slidably or otherwise translatably mounted to the guide structure 114, and an elevator assembly 130 slidably or otherwise translatably mounted to the carriage assembly 120. The first grasping mechanism 112 is rigidly mounted to the elevator assembly 130. The carriage assembly 120 is configured to translate horizontally relative to the table 40 with the elevator assembly 130 and the first grasping mechanism 112 moving in unison therewith. The elevator assembly 130 is in turn configured to translate vertically relative to the carriage assembly 120 with the first grasping mechanism 112 moving in unison therewith.

The guide structure 114 is illustrated in FIG. 8 as a rail extending in the first radial direction with the rail terminating adjacent an edge defining the opening 42. The rail is configured to mate with a sliding structure disposed on an underside of the carriage assembly 120. A gear rack 116 extends alongside the guide structure 114 in parallel thereto. A first rotary actuator (not shown) disposed within and mounted to the carriage assembly 120 is configured to selectively rotate a rotary shaft thereof to rotate an associated pinion gear (not shown), which may be directly coupled to the rotary shaft or otherwise driven by the rotary shaft. The pinion gear may be mated with the teeth of the gear rack 116 in a manner wherein rotation of the first rotary actuator in a first rotational direction causes translation of the carriage assembly 120 radially inwardly towards the extended position of the first robotic arm assembly 110 and rotation of the first rotary actuator in a second rotational direction causes translation of the carriage assembly 120 radially outwardly towards the retracted position of the first robotic arm assembly 110.

The elevator assembly 130 is slidably coupled to the carriage assembly 120 along vertically extending and mating rail structures (not shown) formed on each respective component. The carriage assembly 120 may further house a second rotary actuator (not shown) therein, wherein the second rotary actuator is similarly configured to rotate a rotary shaft thereof for rotating an associated pinion gear. The pinion gear associated with the second rotary actuator is engaged with a gear rack arranged vertically along the elevator assembly 130. Rotation of the second rotary actuator in a first rotational direction causes translation of the elevator assembly 130 and the corresponding first grasping mechanism 112 in the direction of passage of the harness through the braiding machine 10, which corresponds to the upward vertical direction as depicted in the appended figures. Rotation of the second rotary actuator in a second rotational direction causes translation of the elevator assembly 130 and the corresponding first grasping mechanism 112 in a direction opposite the direction of passage of the harness through the braiding machine 10, which corresponds to the downward vertical direction as depicted herein.

The carriage assembly 120 includes a first projection 121 and a second projection 122. The first projection 121 projects away from a bottom portion of the carriage assembly 120 disposed adjacent the table 40 and the second projection 122 projects away from a top portion of the carriage assembly 120. Each of the projections 121, 122 projects in a direction parallel to the first radial direction. The first projection projects 121 beneath the elevator assembly 130 and the first grasping mechanism 112 while the second projection 122 projects above the elevator assembly 130 and the first grasping mechanism 112. A distal end of the first projection 121 includes a first harness guide 123 and a distal end of the second projection 122 includes a second harness guide 124. An inner surface of each of the harness guides 123, 124 is concave and semi-circular in shape.

Figure 9:
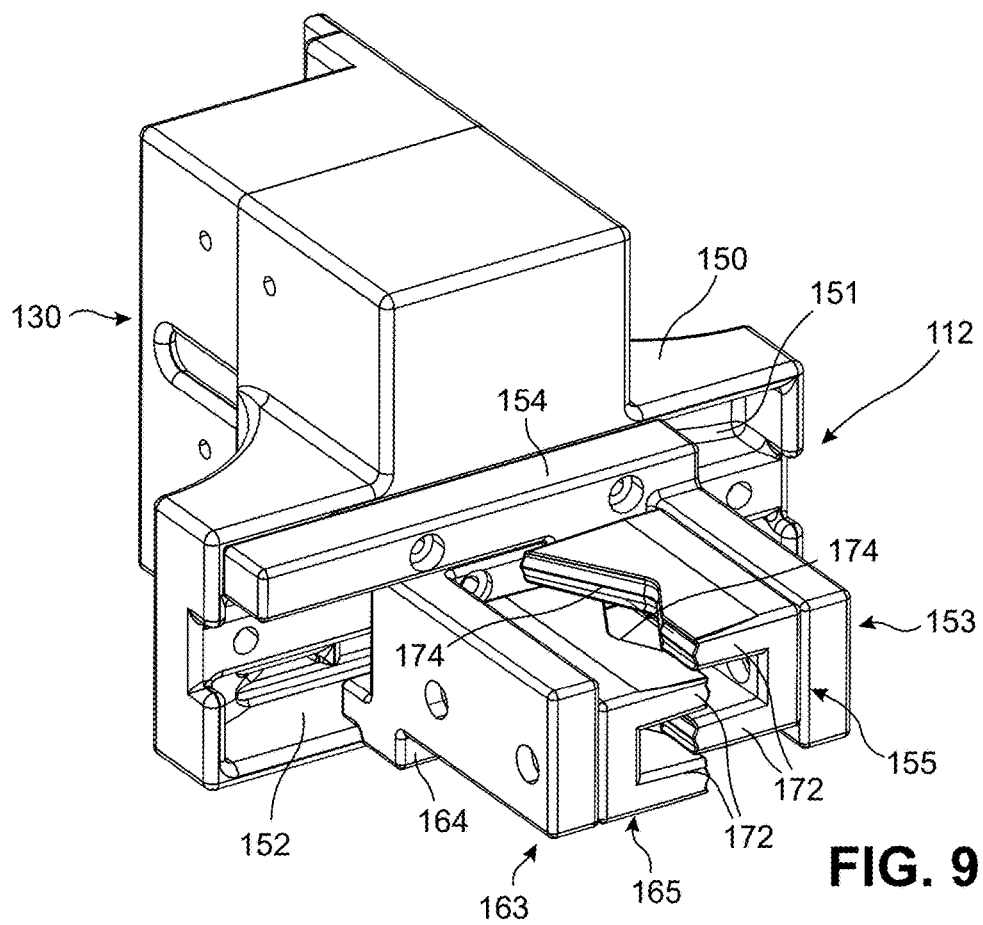
FIG. 9 is a front perspective view showing a grasping mechanism of the first robotic arm assembly of FIG. 8.

Referring now to FIG. 9, the elevator assembly 130 and the first grasping mechanism 112 are shown in isolation to better show and describe the features thereof. The first grasping mechanism 112 includes a body 150 having a first slot 151 and a second slot 152 formed therein. Each of the slots 151, 152 extends longitudinally in a horizontal direction arranged perpendicular to the longitudinal direction of the harness as well as the first radial direction along which the carriage assembly 120 is configured to translate. An interior (not shown) of the body 150 may include a third rotary actuator having a rotary shaft coupled to an associated pinion gear.

A first finger 153 of the first grasping mechanism 112 includes a sliding body 154 and a gripping structure 155. A portion of the sliding body 154 is configured to extend through the first slot 151 to slidably engage a rail (not shown) disposed within the body 150, wherein the rail extends longitudinally in parallel to the direction of extension of the first slot 151. The portion of the sliding body 154 extending into the interior of the body 150 also includes a gear rack disposed thereon with the gear rack engaging the pinion gear of the third rotary shaft from a position above the pinion gear. A second finger 163 of the first grasping mechanism 112 includes a sliding body 164 and a gripping structure 165. A portion of the sliding body 164 is configured to extend through the second slot 152 to slidably engage the rail disposed within the body 150. A portion of the sliding body 164 extending into the interior of the body 150 includes a gear rack disposed thereon with the gear rack engaging the pinion gear of the third rotary shaft from a position below the pinion gear. Rotation of the third rotary actuator in a first rotational direction causes each of the sliding bodies 154, 164 to move in opposing directions for separating the gripping structures 155, 165 from each other, whereas rotation of the third rotary actuator in a second rotational direction causes each of the sliding bodies 154, 164 to reverse their motion to once again move in opposing directions for bringing the gripping structures 155, 165 back together.

The first rotary actuator, the second rotary actuator, and the third rotary actuator may each be servo motors having built in features such as current monitoring, current limiting, position feedback, and acceleration/velocity feedback, as non-limiting examples. Each of the servo motors may be in signal communication with the control system. The control system may be configured to send control signals to each of the servo motors for selectively actuating each of the servo motors to cause the motions described hereinabove. The control system is also configured to receive any control signals generated by the above-described built-in features of the servo motors.

The control system may accordingly be aware of the instantaneous configuration of the first robotic arm assembly 110 by referencing data such as the position of the carriage assembly 120 relative to the table 40 via data originating from the position feedback feature of the first rotary actuator, the position of the elevator assembly 130 relative to the carriage assembly 120 via data originating from the position feedback feature of the second rotary actuator, and the spacing present between the gripping structures 155, 165 via data originating from the position feedback feature of the third rotary actuator. The current monitoring features may allow for the forces required to perform each task using each of the rotary actuators to be monitored as well. The control system may accordingly be aware of the force required to translate the carriage assembly 120 relative to the table 40, the force required to translate the elevator assembly 130 relative to the carriage assembly 120, or the force required to translate the gripping structures 155, 165 towards or away from each other. The current limiting features may also allow certain processes to be ceased when excessive forces are experienced by any of the rotary actuators.

Each of the gripping structures 155, 165 projects away from the corresponding sliding body 154, 164 in a direction parallel to the first radial direction. Each of the gripping structures 155, 165 includes a substantially U-shaped cross-section when viewed from the perspective of the first radial direction. Each of the corresponding gripping structures 155, 165 includes a pair of engaging projections 172 projecting towards the other of the gripping structures 155, 165. Each of the engaging projections 172 is substantially plate-like in configuration with a plane of each of the engaging projections 172 arranged parallel to a plane of the table 40. The gripping structures 155, 165 are offset from each other with respect to the longitudinal direction of the harness to cause one of the engaging projections 172 from each of the gripping structures 155, 165 to be interposed between the pair of the engaging projections 172 of the other of the gripping structures 155, 165. An inner facing surface of each of the engaging projections 172 includes a concave indentation 174 formed therein. Each of the concave indentations 174 may be substantially triangular or V-shaped in configuration to aid in centering the trunk of the harness between the gripping structures 155, 165 when the gripping structures 155, 165 are moved towards one another for grasping the harness. For example, with reference to FIG. 9, it can be seen that the opposing V-shaped concave indentations 174 are configured to guide a substantially cylindrical trunk to be centered relative to the surfaces forming the opposing V-shaped concave indentations 174.

The first grasping mechanism 112 is accordingly adjustable between a fully open position wherein the gripping structures 155, 165 are maximally spaced from one another and a fully closed position wherein the gripping structures 155, 165 are minimally spaced from one another, which is illustrated in FIG. 9. The first grasping mechanism 112 is also configured to be adjustable to a grasping position wherein the opposing gripping structures 155, 165 apply a desired clamping force to the outer surface of the covered portion of the harness. The desired clamping force refers to the clamping force that must be applied to the covered portion of the harness by the first grasping mechanism 112 to prevent the slipping of the covered portion of the harness relative to the first grasping mechanism 112 when the first robotic arm assembly 110 is pulling the harness in the longitudinal direction thereof. The first grasping mechanism 112 may also be configured to be adjustable to a functionally open position, wherein the functionally open position refers to a spacing present between the opposing gripping structures 155, 165 that is greater than that of the grasping position and less than that of the fully open position. The functionally open position may be utilized between each grasping process initiated by the first grasping mechanism 112 to maximize the efficiency of the grasping process by avoiding excessive motion of the gripping structures 155, 165 between grasps.

The first grasping mechanism 112 may include a clamping force sensor (not shown) configured to determine when the opposing gripping structures 155, 165 have applied the desired clamping force to the covered portion of the harness when the gripping structures 155, 165 are brought towards each other for grasping the covered portion of the harness. The clamping force sensor may be formed by the built-in current monitoring feature of the third rotary actuator. As the fingers 153, 163 begin to face resistance when engaging the opposing surfaces of the covered portion of the harness, the amount of force opposing the inward motion of the fingers 153, 163 is measured by the current monitoring feature of the third rotary actuator. Once the measured clamping force reaches a specified value, the third rotary actuator stops attempting to bring the fingers 153, 163 towards each other and the first grasping mechanism 112 has been fully adjusted to the grasping position. The position feedback feature of the third rotary actuator may also be utilized to determine the spacing present between the opposing gripping structures 155, 165 when the grasping position of the first grasping mechanism 112 has been achieved. The control system can utilize this data to determine the diameter or thickness of the trunk of the harness, which can in turn be utilized by the control system when making other determinations as described hereinafter.

The desired clamping force for establishing a slip-free grasp on the covered portion of the harness may be selected as a multiple of the force required to pull the harness upwardly via the upward translation of the elevator assembly 130 while the first grasping mechanism 112 is in the grasping position. Once again, the built-in current monitoring feature of the second rotary actuator may be utilized to ascertain data regarding the force required to perform the pulling of the harness via the upward translation of the elevator assembly 130. This data can be communicated to and analyzed by the control system in order to determine the necessary clamping force for achieving the proper grasping position of the first grasping mechanism 112.

The second robotic arm assembly 210 includes substantially identical structure to the first robotic arm assembly 110 and operates in substantially identical fashion. The second robotic arm assembly 210 similarly includes a carriage assembly 220 translatable in the second radial direction towards and away from the central axis of the trunk, an elevator assembly 230 translatable to move upward or downward in the longitudinal direction of the trunk, and the second grasping mechanism 212 configured for selectively grasping the covered portion of the trunk. The carriage assembly 220 further includes a first projection 221 having a first harness guide 223 and a second projection 222 having a second harness guide 224. As can be seen in FIG. 8, the first harness guides 123, 223 cooperate with each other to form a first harness collar 128 and the second harness guides 124, 224 cooperate with each other to form a second harness collar 129 when the first and second robotic arm assemblies 110, 210 are each adjusted to the extended positions thereof corresponding to the grasping of the harness. The harness collars 128, 129 are configured to guide the harness longitudinally during the braiding process to prevent the formation of excess forces acting on the harness in a direction perpendicular to the longitudinal direction thereof. The braiding machine 10 may alternatively be provided with only the first harness collar 128 or only the second harness collar 129 while remaining within the scope of the present invention.

The only relevant distinction between the first and second robotic arm assemblies 210 relates to the position of each of the first and second grasping mechanisms 112, 212 relative to the corresponding elevator assembly 130, 230. Specifically, the first grasping mechanism 112 is positioned adjacent a lower end of the elevator assembly 130 while the second grasping mechanism 212 is positioned adjacent an upper end of the elevator assembly 230. These different configurations result in the first grasping mechanism 112 having a first range of motion with respect to the longitudinal direction of the trunk and the second grasping mechanism 212 having a second range of motion with respect to the longitudinal direction of the trunk, wherein the first range of motion and the second range of motion are equal in length and do not overlap one another. In the present embodiment, the first grasping mechanism 112 is configured to translate along a range of positions extending between the first harness collar 128 and a midpoint between the first harness collar 128 and the second harness collar 129 with respect to the longitudinal direction of the trunk, while the second grasping mechanism 212 is configured to translate along a range of positions extending between the midpoint between the collars 128, 129 to the second harness collar 129 with respect to the longitudinal direction of the trunk.

The grasping mechanisms 112, 212 are configured to move between a proximate configuration (FIG. 14) and a distant configuration (FIG. 15). The proximate configuration includes the grasping mechanisms 112, 212 with a minimal spacing therebetween with respect to the longitudinal direction of the trunk while the distant configuration includes the grasping mechanisms 112, 212 with a maximal spacing therebetween with respect to the longitudinal direction of the trunk. The proximate and distant configurations each illustrate the respective end points of each of the ranges of motion of the grasping mechanisms 112, 212 described above. The first grasping mechanism 112 is configured to move in an opposite direction than the second grasping mechanism 212 when the grasping mechanisms 112, 212 move between the proximate and distant configurations, with the exception of a brief period of time in which each of the grasping mechanisms 112, 212 moves in the direction of travel of the harness to ensure a desirable hand-off of the harness from one of the grasping mechanisms 112, 212 to the other of the grasping mechanisms 112, 212. For example, as the first grasping mechanism 112 moves downwardly towards the barrel 60, the second grasping mechanism 212 moves upwardly away from the barrel 60 while grasping the harness, thereby pulling the harness in the desired direction. The first grasping mechanism 112 is configured to be transported downwardly at a speed that is slightly greater than a speed the second grasping mechanism 212 is transported upwardly in order for the first grasping mechanism 112 to reach the lowermost point of the range of motion thereof in advance of the second grasping mechanism 212 reaching the uppermost point of the range of motion thereof. In this way, the first grasping mechanism 112 can change directions and begin the process of grasping the harness immediately prior to the second grasping mechanism 212 releasing its grasp on the harness. The grasping mechanisms 112, 212 may be timed to each be grasping the harness at the same time for a brief interval to ensure the harness is not dropped. This same relationship is present when the first grasping mechanism 112 is pulling the harness upwardly, as the second grasping mechanism 212 is transported downwardly slightly faster than the first grasping mechanism 112 is transported upwardly to allow for the time for the second grasping mechanism 212 to change directions and complete the grasping process before the first grasping mechanism 112 releases its hold on the harness. The grasping mechanisms 112, 212 accordingly move in opposing directions for a majority of the time the grasping mechanisms 112, 212 are transporting between the proximate and distant configurations thereof, and only grasp the harness at the same time for a very brief period of time when switching between the proximate and distant configurations.

The braiding machine 10 is not necessarily limited to the disclosed configuration of each of the robotic arm assemblies 110, 210. For example, as mentioned above, each of the robotic arm assemblies 110, 210 may refer to substantially any mechanism having the actuators and kinematic relationships necessary for selectively extending or retracting the grasping mechanisms 112, 212 towards and away from the trunk of the harness, initiating the grasping of the trunk using one of the grasping mechanisms 112, 212, and then pulling the grasped harness in the longitudinal direction thereof, while still remaining within the scope of the present invention. For example, each of the robotic arm assemblies 110, 210 may instead be presented as a multi-axis robotic arm having the requisite degrees of freedom to orient the corresponding grasping mechanism 112, 212 to a configuration for grasping the trunk, to extend or retract the corresponding grasping mechanism 112, 212 radially toward or away from the trunk, and to move in a rectilinear path corresponding to the direction of passage of the trunk through the braiding machine 10. As another example, the disclosed configuration of each of the robotic arm assemblies 110, 210 may be substantially reversed, wherein the assembly for translating the grasping mechanisms 112, 212 in the longitudinal direction of the trunk is disposed on the table 40 and the assembly for translating the grasping mechanisms 112, 212 in the radial direction of the trunk is coupled to the assembly responsible for the translation of the grasping mechanisms 112, 212 in the longitudinal direction. However, it has been discovered that the disclosed configuration of each of the robotic arm assemblies 110, 210 beneficially reduces the fatigue experienced during the braiding process while also increasing the forces that can be applied by each of the robotic arm assemblies 110, 210 during the braiding process.

Figure 10:
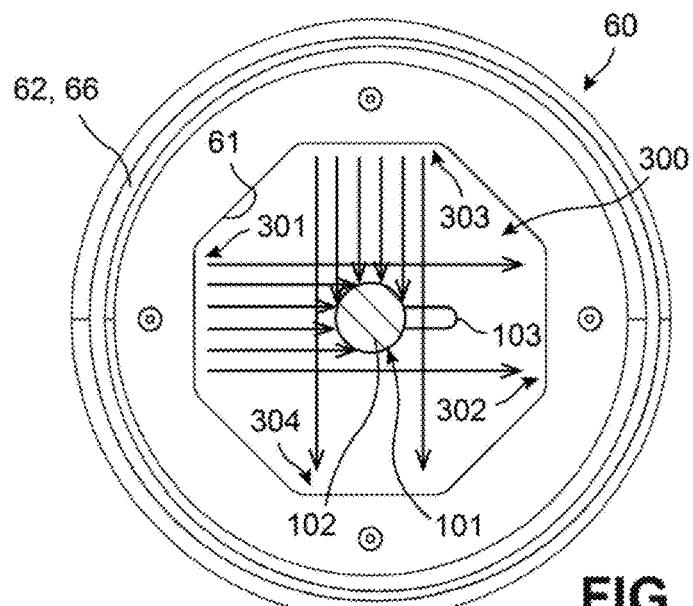
FIG. 10 is a top plan view of a barrel of the braiding machine of FIG. 6, wherein a method of operation of each of a branch detection sensor assembly and an end detection sensor assembly is shown.
Figure 11:
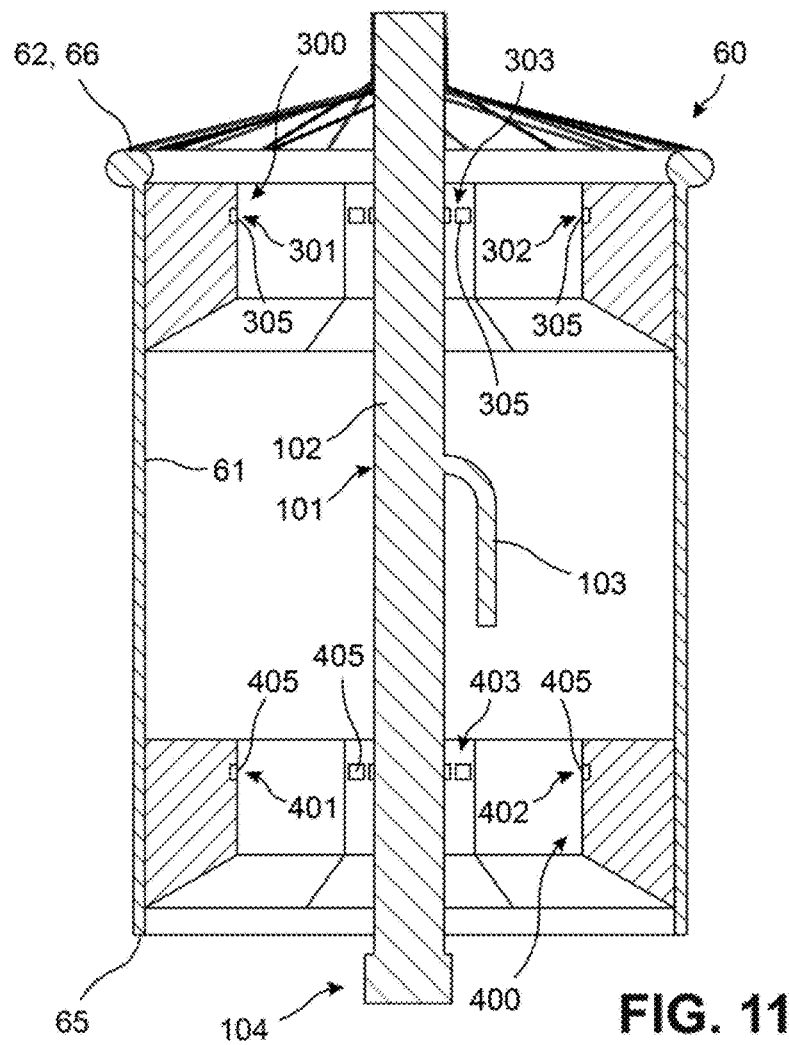
FIG. 11 is a fragmentary elevational cross-sectional view showing the barrel of FIG. 10 in isolation, wherein a harness extends longitudinally through the barrel and includes an exemplary branch for detection by the branch detection sensor assembly and an exemplary end portion for detection by the end detection sensor assembly.

FIGS. 10 and 11 illustrate the barrel 60 in isolation to illustrate a branch detection sensor assembly 300 and an end detection sensor assembly 400 of the braiding machine 10, each of which is disposed within the hollow interior 61 of the barrel 60. The barrel 60 is substantially cylindrical in shape as the barrel 60 extends longitudinally from a first end 65 to a second end 66, wherein the second end 66 of the barrel 60 forms the rim 62 thereof. The end detection sensor assembly 400 is disposed towards the first end 65 of the barrel 60 while the branch detection sensor assembly 300 is disposed towards the second end 66 of the barrel 60. FIGS. 10 and 11 also illustrate a representative harness 101 that may be pulled through the braiding machine 10 during the automatic mode of operation thereof. The harness 101 includes a trunk 102, a branch 103 extending radially from the trunk 102, and an end portion 104 representative of an end of the trunk 102.

The branch detection sensor assembly 300 includes a first sensor array 301, a second sensor array 302, a third sensor array 303, and a fourth sensor array 304. Each of the disclosed sensor arrays 301, 302, 303, 304 is disposed on a common plane arranged perpendicular to the longitudinal direction of the barrel 60. The first sensor array 301 is disposed opposite the second sensor array 302 and the third sensor array 303 is disposed opposite the fourth sensor array 304. The sensor arrays 301, 302 are configured to measure a first dimension (thickness) of the harness 101 with respect to the plane having the arrays 301, 302, 303, 304 disposed thereon from the perspective of a first direction, while the sensor arrays 303, 304 are configured to measure a second dimension (thickness) of the harness 101 with respect to the plane having the arrays 301, 302, 303, 304 from the perspective of a second direction arranged perpendicular to the first direction.

Each of the sensor arrays 301, 302, 303, 304 is comprised of a row of sensor elements 305. Each of the sensor elements 305 may be representative of an emitter or a collector, wherein each emitter of any of the arrays 301, 302, 303, 304 is paired with and faces towards at least one corresponding collector of the oppositely arranged one of the arrays 301, 302, 303, 304. Each of the emitters is configured to emit energy while each of the collectors is configured to sense the energy emitted by one or more of the emitters. For example, each of the emitters may be an infrared light emitter and each of the collectors may be an infrared light sensor. However, other energy sources may utilized, such as other electromagnetic wave types or ultrasonic waves, as desired. Any pattern of the emitters and collectors may be utilized for determining the presence of an object between the emitters and the collectors via the interference of the object with the energy being transmitted between the emitters and the collectors. As one example, each of the sensor elements 305 forming the first sensor array 301 and the third sensor array 303 are emitters while each of the sensor elements 305 forming the second sensor array 302 and the fourth sensor array 304 are collectors. This configuration is shown in FIG. 10, which illustrates the energy transmission between the paired sets of the arrays 301, 302, 303, 304 along a portion of the interior 61 of the barrel 60 corresponding to the passage of the trunk of the harness. In another example, the sensor elements 305 of each of the arrays 301, 302, 303, 304 may alternate between emitters and collectors, so long as corresponding emitter is paired with at least one corresponding collector in the opposing array 301, 302, 303, 304 for sensing an interference pattern as described herein.

With reference to the example shown in FIG. 10, the harness 101 blocks at least some of the energy originating from each of the emitters that is normally directed towards and sensed by one or more of the opposing collectors when the harness 101 is at the position shown in FIG. 11. This blockage occurs with respect to the arrays 301, 302 as well as the arrays 303, 304. The control system of the braiding machine 10 is configured to be aware of an expected thickness (diameter) of the harness 101 with respect to each of the viewing perspectives, wherein the same expected thickness or diameter may be common to both viewing perspectives. This expected thickness or diameter of the harness 101 may be known by the control system from the measurements taken by the grasping mechanism 112, 212 when determining the clamping force necessary for establishing the grasping position of either of the grasping mechanisms 112, 212.

As can be seen in FIGS. 10 and 11, the branch 103 may extend from the trunk 102 in a manner wherein the branch 103 will not block any additional energy between the arrays 301, 302 when passing thereby due to the orientation of the branch 103, but the branch 103 will block a significant amount of additional energy passing between the arrays 303, 304 in comparison to the adjacent longitudinal portions of the trunk 102. The measuring of the thickness of the harness 101 from two perpendicular arranged perspectives accordingly prevents incidences wherein a branch 103 or similar feature may evade detection due an orientation of the branch 103.

The control system is configured to determine the presence of one of the branches 103 any time the paired arrays 301, 302 or the paired arrays 303, 304 sense that the thickness of the harness 101 is greater than the threshold thickness or diameter value known by the control system (as established by the grasping mechanisms 112, 212), wherein such a determination is made by reference to which of the collectors are prevented from receiving energy from the corresponding emitters. Each time the presence of one of the branches 103 is determined, the control system is configured to cease the automatic mode of operation to allow for the branch 103 to be manually pulled through the threads 95 forming the braid, at which point the human operator can reestablish the automated mode of operation. The determination of the presence of one of the branches 103 may cause the braiding machine 10 to cease the automated braiding process immediately or may allow for the harness 101 to advance through the barrel 60 a predetermined distance to bring the detected branch 103 immediately adjacent the intersection of the threads 95 with the trunk 102 of the harness 101, thereby preventing the need to manually braid an excessive length of the trunk 102.

The end detection sensor assembly 400 is substantially identical to the branch detection sensor assembly 300 and includes a plurality of sensor elements 405 arranged into a first sensor array 401, a second sensor array 402 disposed opposite the first sensor array 401, a third sensor array 403 arranged perpendicular to the first and second sensor arrays 401, 402, and a fourth sensor array (not shown) arranged opposite the third sensor array 403, all of which are disposed on a common plane arranged perpendicular to the axial direction of the barrel 60. The sensor elements 405 are once again provided as paired sets of emitters and collectors, wherein an interference pattern sensed by the collectors is correlated to the blockage of energy caused by the harness 101 when passing by the plane of the end detection sensor assembly 400. Each of the emitters may be an infrared light emitter and each of the collectors may be an infrared light sensor. However, other energy sources may utilized, such as other electromagnetic wave types or ultrasonic waves, as desired. The arrays 401, 402 sense the blockage of energy from a first perspective while the arrays 403, 404 sense the blockage of energy from a second perspective arranged perpendicular to the first perspective.

In contrast to the branch detection sensor assembly 300, the control system of the braiding machine 10 determines that the end portion 104 of harness 101 has been detected when the measured dimension of the harness 101 as determined by the control system is less than the expected dimension value, which may be the diameter or thickness of the harness 101 as determined during the grasping of the harness 101 using the grasping mechanisms 112, 212. This lack of energy blockage corresponds to the end portion 104 of the harness 101 having passed by the end detection sensor assembly 400. In similar fashion to the branch detection sensor assembly 300, the control system is configured to either stop the braiding via the automated mode of operation immediately or after the harness 101 has continued to advance through the barrel 60 to a desired position adjacent the recently laid threads 95 on the trunk 102.

The control system is configured to activate each of the disclosed sensor assemblies 300, 400 during the automated mode of operation of the braiding machine 10 by sending appropriate control signals to each of the corresponding sensor assemblies 300, 400. The control system is also configured to receive control signals from each of the sensor elements constituting the collectors described hereinabove regarding the energy sensed by each of the collectors. The control system may be further configured to analyze and interpret the control signals received from the collectors to determine the described measured dimensions of the harness 101.

The branch detection sensor assembly 300 and the end detection sensor assembly 400 are shown and described herein as being two different assemblies spaced apart from one another with respect to the axial direction of the barrel 60. However, the branch detection sensor assembly 300 and the end detection sensor assembly 400 may be integrated into a single sensor assembly that performs each of the above described functions without departing from the scope of the present invention. That is, the control system may be configured to interpret the interference pattern described as occurring with respect to either one of the sensor assemblies 300, 400 and use that information to determine the presence of either and both of the branch or the end portion, depending on whether more energy or less energy is blocked than is expected. This single sensor assembly integrating the capabilities of each described sensor assembly 300, 400 may be positioned anywhere within the interior of the barrel 60, including towards either of the ends 65, 66 thereof as shown with respect to the assemblies 300, 400. The control system may also be adapted to advance the harness the corresponding longitudinal distance after the discovery of either condition in similar fashion to that described above.

Figure 12:
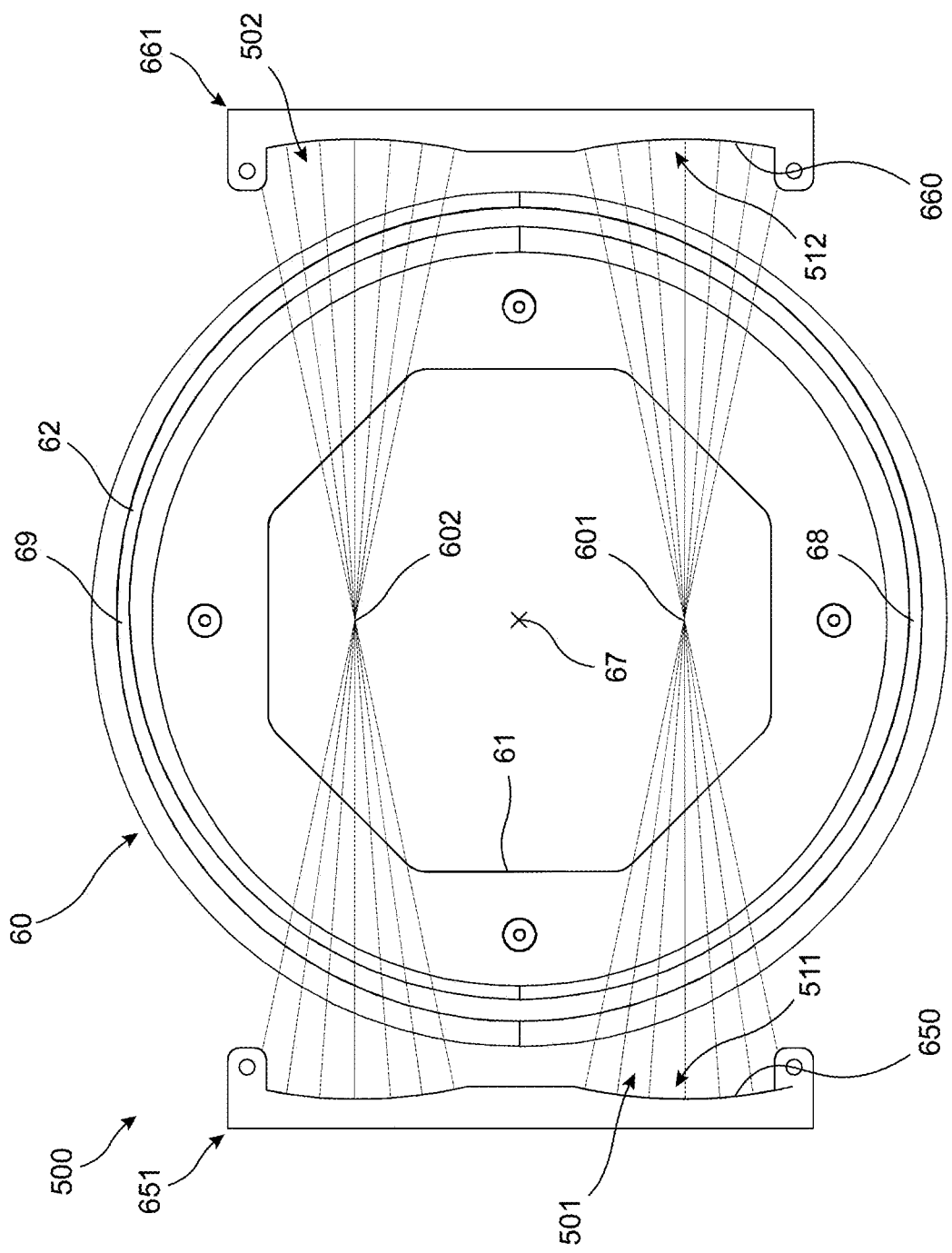
FIG. 12 is a top plan view showing the barrel and a thread angle sensor assembly in isolation for illustrating a method of operation of the thread angle sensor assembly.

Referring now to FIGS. 12 and 13, a thread angle sensor system 500 of the braiding machine 10 is disclosed. The thread angle sensor system 500 is configured to determine the thread angle of the threads 95 as the corresponding bobbins 90 orbit around the barrel 60 via a measurement of a height of each of the threads 95 at a known position relative to the plane of the rim 62 of the barrel 60. The thread angle sensor system 500 is shown relative to the exemplary harness 101 having the trunk 102 in FIG. 13.

The thread angle sensor system 500 comprises a first thread angle sensor assembly 501 and a second thread angle sensor assembly 502. The first thread angle sensor assembly 501 is configured to measure the thread angle of each of the threads 95 when the threads pass through a first axis 601. The first axis 601 extends in parallel to the axial direction of the barrel 60, which is depicted as the vertical direction in the accompanying figures. The first axis 601 is disposed at a known position relative to a central axis 67 of the barrel 60 and the rim 62 of the barrel 60. Specifically, a distance of the first axis 601 from a portion 68 of the rim 62 disposed radially outwardly of the first axis 601 is known with respect to a horizontal direction arranged parallel to the plane defined by the rim 62 and perpendicular to the longitudinal direction of the trunk 102.

The second thread angle sensor assembly 502 is configured to measure the thread angle of each of the threads 95 when the threads pass through a second axis 602. The second axis 602 similarly extends in parallel to the axial direction of the barrel 60, and the second axis 602 is also positioned at a known distance from a corresponding radially outward portion 69 of the rim 62 with respect to the described horizontal direction. The second axis 602 is disposed at a position diametrically opposing that of the first axis 601 relative to the central axis 67 of the barrel 60. The distance of the first axis 601 from the portion 68 of the rim 62 is equal to the distance of the second axis 602 from the portion 69 of the rim 62.

The first thread angle sensor assembly 501 senses the thread angle at the first axis 601 using the same structural configuration and the same methods as applied when the second thread angle sensor assembly 502 senses the thread angle at the second axis 602, hence further description of the structure and methods of operation of the second thread angle sensor assembly 502 is omitted hereinafter.

The first thread angle sensor assembly 501 includes a plurality of sensor elements 505 arranged into a first sensor array 511 adjacent a first side of the barrel 60 and a second sensor array 512 adjacent an opposing second side of the barrel 60. Each of the sensor elements 505 may be an emitter or a collector as described hereinabove with reference to the sensor assemblies 300, 400. Each emitter is directed towards a paired collector. The first sensor array 511 may include all emitters, all collectors, or combinations thereof, and the second sensor array 512 may include whatever emitters or collectors are necessary to pair with those of the first sensor array 511. Each of the emitters may be an infrared light emitter and each of the collectors may be an infrared light sensor. However, other energy sources may utilized, such as other electromagnetic wave types or ultrasonic waves, as desired.

The sensor elements 505 of the first sensor array 511 are arranged along a first arcuate surface 650 of a first sensor bank structure 651 and the sensor elements 505 of the second sensor array 512 are arranged along a second arcuate surface 660 of a second sensor bank structure 661 arranged opposite the first sensor bank structure 651. The sensor bank structures 651, 652 may be disposed on an underside of the table 40 at a position just above the rim 62 of the barrel 60. Each of the arcuate surfaces 650, 660 includes a radius of curvature corresponding to the distance of the corresponding arcuate surface 650, 660 from the first axis 601. Each of the sensor elements 505 forming the first sensor array 511 is angularly displaced from each adjacent sensor element 505 with respect to the first axis 601. Similarly, each of the sensor elements 505 forming the second sensor array 512 is angularly displaced from each adjacent sensor element 505 with respect to the first axis 601. Each of the sensor elements 505 of the first sensor array 511 is directed towards and disposed diametrically opposed to a paired sensor element 505 of the second sensor array 512.

As can be seen in FIG. 13, each of the sensor elements 505 forming one of the arrays 511, 512 is disposed at a different position (height) relative to the longitudinal direction of the trunk, hence each of the paired emitter and collector sets of the sensor elements 505 directs the energy therebetween at different positions along the first axis 601 with respect to the longitudinal direction of the trunk. The angular displacement present between adjacent ones of the sensor elements 505 beneficially allows for the sensor elements 505 to be spaced apart from each other with respect to the longitudinal direction of the trunk by smaller distances than would be possible with a linear array of the sensor element 505, as each of the sensor elements 505 may partially overlap each other with respect to the longitudinal direction of the trunk while still accessing the condition of the first axis 601 due to the different angular orientations. The angular displacement of the sensor elements 505 accordingly increases the resolution of the first thread angle sensor assembly 501 by increasing the possible number of sensor elements 505 that can be stacked in the longitudinal direction of the trunk.

The first thread angle sensor assembly 501 determines the instantaneous thread angle of one of the threads 95 passing over the first axis 601 by sensing which of the emitter and collector pairs are instantaneously blocked by at least one of the threads 95. Of the blocked emitter and collector pairings, the pairing disposed furthest from the plane of the rim 62 with respect to the longitudinal direction of the trunk corresponds to a height of the instantaneously measured thread 95. Those emitter and collector pairings that are blocked closer to the plane of the rim 62 correspond to other threads 95 at other angular positions around the barrel 60 blocking the energy passed between the paired emitters and collectors below the position of the instantaneously measured thread 95. For example, it can be seen in FIG. 13 that only the uppermost one of the sensor elements 505 forming one of the emitters or collectors is disposed above the uppermost of the threads 95 disposed at the first axis 601. The second to highest of the sensor elements 505 forming one of the emitters or collectors is accordingly the highest of the paired emitters and collectors to detect the blockage of a thread 95. The distance of the furthest blocked emitter and collector pairing from the plane of the rim 62 accordingly corresponds to the height of the instantaneously measured thread 95 above the plane of the rim 62.

The control system of the braiding machine 10 accordingly knows the distance of the axis 601 from the radially disposed portion 68 of the rim 62 with respect to the horizontal direction arranged perpendicular to the longitudinal direction of the trunk, wherein the radially disposed portion 68 corresponds to the portion of the rim 62 at which the thread 95 being instantaneously measured contacts the rim 62 when tensioned over the rim 62. The control system is also aware of the height of the thread 95 at the first axis 601 as known by the determination of the furthest sensor element 505 pairing blocked or interfered with by the thread 95. The control system accordingly knows the dimensions of two perpendicular arranged sides of a right-angled triangle, which can then be used to determine the angle of the thread 95 between the rim 62 and the corresponding trunk of the harness to determine the thread angle at the first axis 601.

The thread angle sensor system 500 may operate using only one of the thread angle sensor assemblies 501, 502 and the determination of only one thread angle, as desired, without departing from the scope of the present invention. However, the use of two angle measurements taken at diametrically opposing portions of the cone shape formed by the threads 95 prevents any slight variations in the measurement process from negatively affecting the braiding process. The control system may be configured to average the measured thread angles as determined with respect to each of the different axes 601, 602 to arrive at an average thread angle of two of the diametrically opposing threads 95. The average thread angle may alternatively be referred to as a cone angle of the threads 95 due to the manner in which the average thread angle determines the condition of two points on the substantially conical shape formed by the cooperation of the threads 95. The use of the averaged cone angle measurement may eliminate situations wherein sensing defects, vibrations, or other slight or unexpected variations to the instantaneous thread angle determination process negatively affect the ability to ascertain the actual state of the angle of the threads 95.

A general method of operation of the braiding machine 10 is now disclosed with reference to FIGS. 14 and 15, with an emphasis on the novel automated mode of operation of the braiding machine 10. The method of operation of the braiding machine 10 is shown relative to the exemplary harness 101 having the trunk 102.

First, an operator of the braiding machine 10 determines the desired thread angle or cone angle at which the tension applied to the threads 95 forms the desired weave pattern and coverage of the harness 101. A desired coverage of the harness 101 refers to the weave formed by the threads covering a desired percentage of an exposed outer surface of the harness 101 following completion of the braiding process. As explained with reference to FIGS. 3-5 when discussing the background of the present invention, the coverage is considered to be less than desired when the gaps between adjacent windings of the threads are greater than desired, which results in the formation of diamond-shaped openings where each adjacent pair of threads wound in the first orbiting direction crosses over each adjacent pair of threads wound in the second orbiting direction. The coverage is considered to be greater than desired when the gaps between adjacent windings of the threads are smaller than desired, including the adjacent windings partially overlapping, which can lead to a doubling up of the threads in the radial direction of the trunk.

Figure 4:
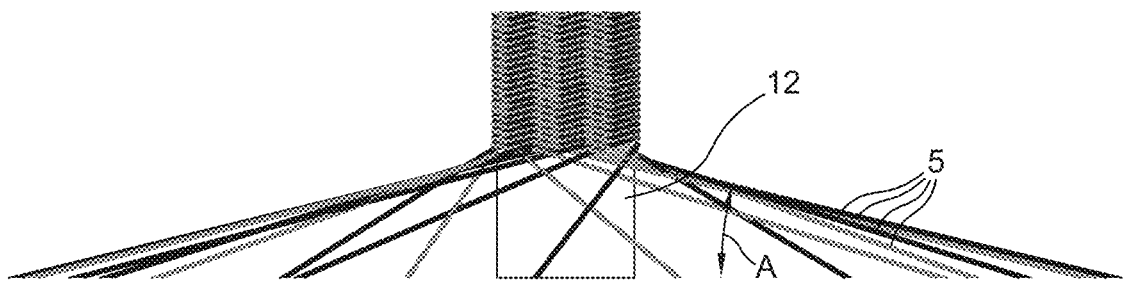
FIG. 4 is a fragmentary side elevational view of a portion of a braiding machine showing a thread angle that is ideal for producing a desired weave pattern on an associated harness during the braiding process.
Figure 5:
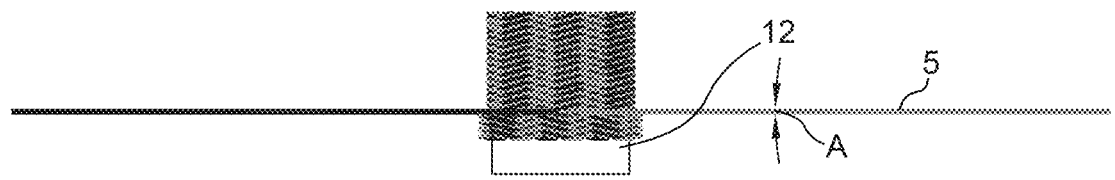
FIG. 5 is a fragmentary side elevational view of a portion of a braiding machine showing a thread angle that is smaller than desired for producing a desired weave pattern on an associated harness during the braiding process.

The desired coverage of the harness 101 does not necessarily have to match the weave configuration shown in FIG. 4, which is generally described as having ideal spacing between the adjacent windings of the weave. For example, in some circumstances it may be desirable to leave larger gaps between the windings of the threads than those shown in FIG. 4 in order to change the flexibility or the breathability of the resulting woven cover. In such a circumstance, the weave shown in FIG. 3 may be representative of the desired coverage of the harness, which in turn results in the adjustment of the desired thread angle or desired cone angle used in operating the braiding machine 10. More specifically, as the desired coverage of the harness is decreased, the desired thread angle or cone angle to be used for the corresponding braiding process is increased. Similarly, as the desired coverage of the harness is increased, the desired thread angle or cone angle to be used for the corresponding braiding process is decreased. The desired thread angle or cone angle should accordingly not be considered to be any one target value, but is instead result specific and based on the desired settings of the operator of the braiding machine 10, wherein the desired thread angle or cone angle is chosen to correspond to the desired amount of coverage of the harness.

The desired thread angle or cone angle for a given application may also vary if the type of thread used in forming the braid is varied. For example, as the nominal diameter of the thread changes, so too does the amount of coverage the thread applies to the exposed surfaces of the harness with respect to the same configuration of the threads forming the weave. Accordingly, the desired thread angle or cone angle may also be chosen to account for the characteristics of the type of thread chosen in forming the braid, and more specifically the nominal diameter or thickness of the threads.

Once the desired thread angle or cone angle is determined and the control system is made aware of this determination, the harness 101 may be fed through the barrel 60 with an end of each of the threads 95 coupled to an outer surface of the trunk. A leading end portion of the harness may be braided initially using the manual mode of operation, as desired, wherein the manual operator initiates the bobbin orbiting assembly 50 and pulls the leading end portion of the harness through the orbiting threads to begin the formation of the woven cover over the harness. However, the manual braiding of the leading end portion of the harness is not necessarily required to remain within the scope of the present invention.

Once the harness 101 is extended longitudinally through the barrel 60 and engaged with the threads 95, the automated mode of operation may be initiated by pressing one of the buttons 33 associated with placing the braiding machine 10 in a ready position suitable for starting the automated braiding process. The ready position may include the control system commanding each of the robotic arm assemblies 110, 210 to translate to the respective extended positions thereof wherein the corresponding grasping mechanisms 112, 212 are positioned for selectively grasping the trunk 102.

When the robotic arm assemblies 110, 210 are in the respective extended positions thereof, the automated braiding process may be initiated by pushing another of the buttons 33 corresponding to the starting of the orbiting of the bobbins 90 via the bobbin orbiting assembly 50. In other embodiments, the same button 33 may be pressed for each successive step of the automated braiding process, as desired. The present invention may include the use of any method or structure for initiating each successive step of the automated braiding process using any type or form of user interface while remaining within the scope of the present invention. The control system commands the different sets 91, 92 of the bobbins 90 to orbit around the barrel 60 in the opposing orbiting directions to begin the formation of the woven cover on the trunk 102 of the harness 101.

The initiation of the automated braiding process also includes the control system commanding the robotic arm assemblies 110, 210 to begin pulling the harness 101 longitudinally through the barrel 60 via the selective grasping and pulling of the grasping mechanisms 112, 212.

The process of pulling the harness 101 using the grasping mechanisms 112, 212 includes the grasping mechanisms 112, 212 constantly repositioning between the proximate configuration thereof and the distant configuration thereof. For example, referring to FIG. 14, the illustrated proximate configuration of the grasping mechanisms 112, 212 may correspond to a moment in which the first grasping mechanism 112 is adjusted from the grasping position to the fully open position or the functionally open position thereof to release the harness 101. Immediately prior to this moment, the second grasping mechanism 212 changes direction and is adjusted from the fully open position or the functionally open position thereof to the grasping position thereof. The second grasping mechanism 212 immediately begins pulling the harness 101 upwardly upon grasping the harness 101 while the first grasping mechanism 112 immediately changes directions and begins moving downwardly as the grasping mechanisms 112, 212 move towards the distant configuration thereof, as illustrated in FIG. 15. The grasping mechanism 112, 212 instantaneously moving downwardly moves at a slightly greater speed than the grasping mechanism 112, 212 instantaneously moving upwardly to account for the period of time in which both grasping mechanisms 112, 212 move upwardly while grasping the harness 101 during the hand-off thereof between the grasping mechanisms 112, 212.

Referring now to FIG. 15, once the grasping mechanisms 112, 212 reach the illustrated distant configuration thereof, the second grasping mechanism 212 is adjusted from the grasping position thereof to the fully open position or functionally open position thereof immediately following the first grasping mechanism 112 changing directions and being adjusted to the grasping position thereof. The second grasping mechanism 212 immediately moves downwardly and the first grasping mechanism 112 continues to move upwardly while the grasping mechanisms 112, 212 are once again returned towards the proximate configuration of FIG. 14. This process is repeatedly continuously as the harness 101 is pulled longitudinally through the braiding machine 10. This method of bringing the grasping mechanisms 112, 212 towards one another and then apart while pulling the harness 101 may be referred to as a hand-to-hand pulling process, as opposed to a hand-over-hand pulling process wherein the grasping mechanisms 112, 212 pass around one another longitudinally between each grasping action.

The initiation of the automated braiding process also includes the control system commanding the thread angle sensor system 500 to begin monitoring the height of the threads 95 while passing through each of the axes 601, 602 via the two distinct thread angle sensor assemblies 501, 502. A thread angle is repeatedly measured at each of the axes 601, 602 with the two different measured angles averaged together to provide a measured average thread angle, which may be referred to as the measured cone angle.

Each time the control system determines one of the measured cone angles, the control system compares the measured cone angle to the desired cone angle as preselected by the operator. If the measured cone angle is greater than the desired cone angle, then the control system sends a control signal indicating that the grasping mechanisms 112, 212 must incrementally reduce their rate of translation to slow the rate at which the harness 101 is pulled upwardly, which in turn reduces the tension on the threads 95. If the measured cone angle is equal to the desired cone angle, then the control system allows the grasping mechanisms 112, 212 to continue to translate at the current rate, thereby maintaining the proper tension on the threads 95. If the measured cone angle is less than the desired cone angle, then the control system sends a control signal indicating that the grasping mechanisms 112, 212 must incrementally increase their rate of translation to increase the rate at which the harness 101 is pulled upwardly, which in turn increases the tension on the threads 95. This comparison is repeatedly made between the measured cone angle and the desired cone angle for dynamically adjusting the speed of the grasping mechanisms 112, 212 in order to maintain the desired weave pattern of the threads 95 and coverage of the trunk 102 of the harness 101.

As mentioned previously, the same comparisons may alternatively be made between a single measured thread angle and a desired thread angle if only one thread angle sensor assembly 501, 502 is utilized. Additionally, the control system may also be configured to compare the measured cone angle or measured thread angle to a desired range of thread angles, wherein the adjustments to the speed of each of the grasping mechanisms 112, 212 described above only occur when the measured thread angle or measured cone angle is greater than the desired range of thread angles or cone angles or lower than the desired range of thread angles or cone angles.

The initiation of the automated braiding process also includes the control system commanding the branch detection sensor assembly 300 and the end detection sensor assembly 400 to collect data regarding the diameter of the harness 101 from each of the corresponding perspectives when passing by each of the sensor assemblies 300, 400. The measured diameter at each of the sensor assemblies 300, 400 is compared to the measured diameter as determined by the servo motor associated with operation of each of the grasping mechanisms 112, 212. Specifically, each measured diameter by the sensor assemblies 300, 400 is compared to the most recent measured diameter by one of the grasping mechanisms 112, 212 to determine when a branch or end of the harness pass by the respective sensor assemblies 300, 400. As mentioned above, the braiding process may cease immediately or after the harness 101 is advanced until the branch or the end of the harness 101 is adjacent the junction of the threads 95 with the harness 101.

The sensing of a branch 103 or an end portion 104 of the harness 101 may cause the automated mode of operation to cease and may prompt the operator to switch to the manual mode of operation. The control system may automatically reposition the robotic arm assemblies 110, 210 to the retracted positions thereof or one of the buttons 33 may be pressed to actively command the retraction of the assemblies 110, 210. Once retracted, the manual mode of operation may be utilized to continue the braiding process temporarily. For example, if a branch 103 is detected, the operator may manually pull the branch 103 through the threads 95 while braiding around the branch 103. Once the branch 103 has passed, the operator can once again initiate the automated mode of operation to cause the robotic arm assemblies 110, 210 to once again move to the extended position thereof. If the end portion 104 is detected, the manual operator completes the braiding process manually adjacent the end portion 104 to end the braiding process.

The automated braiding machine 10 shown and described herein provides numerous benefits over traditionally manual methods of pulling the harness to create a braided harness. Particularly, the automated braiding machine 10 allows for the operator to monitor multiple automated braiding machines 10 simultaneously without having to manually pull each harness individually, therefore enhancing productivity. Specifically, the operator only has to address the automated braiding machines 10 when certain conditions are detected or to begin or end each process, but the longitudinal portions of each harness can be braided for extended periods of time uninterrupted between such events. Also, manually pulling each harness is a generally high-fatigue task that forces the operator to be hunched over or requires the operator to use their elbows to brace themselves for long periods of time, inherently causing ergonomic issues. The automated braiding machine 10 mitigates the fatigue generally associated with the task of manually pulling the harness.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An automated braiding machine for applying a braided cover to an elongate structure, the automated braiding machine comprising:
    a barrel through which the elongate structure passes in a longitudinal direction thereof;
    a bobbin orbiting assembly configured to orbit a plurality of bobbins around the barrel, each of the bobbins unwinding a corresponding thread having a portion extending between a rim of the barrel and the elongate structure;
    a pulling assembly configured to pull the elongate structure unidirectionally in the longitudinal direction thereof to cause the elongate structure to progressively pass longitudinally through the barrel before being engaged by the threads unwinding from the plurality of the bobbins as the braided cover is applied to the elongate structure; and
    a thread angle sensor assembly configured to sense a measured thread angle of the portion of one of the threads relative to a plane defined by the rim of the barrel, wherein the pulling assembly is configured to change a speed at which the elongate structure is pulled in the longitudinal direction thereof when the measured thread angle is different from a desired thread angle preselected to correspond to a desired coverage of the braided cover around the elongate structure.

2. The braiding machine of claim 1, wherein the speed at which the elongate structure is pulled in the longitudinal direction thereof is increased when the measured thread angle is less than the desired thread angle, and wherein the speed at which the elongate structure is pulled in the longitudinal direction thereof is decreased when the measured thread angle is greater than the desired thread angle.

3. The braiding machine of claim 1, wherein the thread angle sensor assembly includes a first array of sensor elements spaced apart from each other with respect to the longitudinal direction of the elongate structure and a second array of sensor elements spaced apart from each other with respect to the longitudinal direction of the elongate structure, wherein the measured angle is determined based on an interference pattern of the portion of the thread with respect to energy directed between the first array of sensor elements and the second array of sensor elements.

4. The braiding machine of claim 3, wherein the interference pattern of the energy directed between the first array of sensor elements and the second array of sensor elements is measured along a first axis extending in parallel to the longitudinal direction of the elongate structure at a first distance from a central axis of the barrel.

5. The braiding machine of claim 4, wherein each of the sensor elements of the first array is paired with one of the sensor elements of the second array for directing energy therebetween and through the first axis in a direction perpendicular thereto.

6. The braiding machine of claim 5, wherein each of the pairs of the sensor elements directs energy through the first axis at a different angular orientation relative to the first axis.

7. The braiding machine of claim 1, further comprising a branch detection sensor assembly disposed within an interior of the barrel, the branch detection sensor assembly configured to detect a presence of a branch extending from the elongate structure.

8. The braiding machine of claim 7, wherein the pulling assembly is configured to stop pulling the elongate structure in the longitudinal direction thereof following the detection of the presence of the branch.

9. The braiding machine of claim 7, wherein the detection of the presence of the branch is dependent on a first measured diameter of the elongate structure as sensed by the branch detection sensor assembly.

10. The braiding machine of claim 7, wherein the branch detection sensor assembly includes a first array of sensor elements and an oppositely arranged second array of sensor elements, wherein the first measured diameter is determined based on an interference pattern of the elongate structure with respect to energy directed between the first array of sensor elements and the second array of sensor elements.

11. The braiding machine of claim 1, further comprising an end detection sensor assembly disposed within an interior of the barrel, the end detection sensor assembly configured to detect a presence of an end of the elongate structure.

12. The braiding machine of claim 11, wherein the pulling assembly is configured to stop pulling the elongate structure in the longitudinal direction thereof following the detection of the presence of the end of the elongate structure.

13. The braiding machine of claim 1, wherein the pulling assembly includes a first grasping mechanism configured to apply a clamping force to the elongate structure, wherein the clamping force is proportional to a pulling force applied by the pulling assembly to the elongate structure with respect to the longitudinal direction thereof.

14. The braiding machine of claim 1, wherein the elongate structure includes a trunk having a varying circumference with respect to the longitudinal direction of the elongate structure, wherein the pulling assembly is configured to change the speed at which the elongate structure is pulled in the longitudinal direction thereof to adjust the measured thread angle towards the desired thread angle in response to the circumference of the trunk changing where the threads are instantaneously being applied to the trunk as the braided cover is applied to the elongate structure.

15. A method of automatically applying a braided cover to an elongate structure comprising the steps of:
  orbiting a plurality of bobbins around a barrel, each of the bobbins unwinding a corresponding thread having a portion extending between a rim of the barrel and the elongate structure; and
  pulling the elongate structure unidirectionally in the longitudinal direction thereof using a pulling assembly to cause the elongate structure to progressively pass longitudinally through the barrel before being engaged by the threads unwinding from the plurality of bobbins as the braided cover is applied to the elongate structure;
  measuring a thread angle of the portion of one of the threads relative to a plane defined by the rim of the barrel using a thread angle sensor assembly;
  comparing the measured thread angle to a preselected desired thread angle; and
  changing a speed at which the elongate structure is pulled in the longitudinal direction thereof when the measured thread angle is different from the desired thread angle.

16. The method of claim 15, further including ceasing the orbiting of the plurality of the bobbins when a branch is detected as extending from the elongate structure.

17. The method of claim 15, further including ceasing the orbiting of the plurality of the bobbins when an end of the elongate structure is detected.

18. The braiding machine of claim 15, wherein the elongate structure includes a trunk having a varying circumference with respect to the longitudinal direction of the elongate structure, wherein the pulling assembly is configured to change the speed at which the elongate structure is pulled in the longitudinal direction thereof to adjust the measured thread angle towards the desired thread angle in response to the circumference of the trunk changing where the threads are instantaneously being applied to the trunk as the braided cover is applied to the elongate structure.

19. An automated braiding machine for applying a braided cover to an elongate structure, the automated braiding machine comprising:
  a barrel having an interior through which the elongate structure passes in a longitudinal direction thereof;
  a bobbin orbiting assembly configured to orbit a plurality of bobbins around the barrel, each of the bobbins unwinding a corresponding thread having a portion extending between a rim of the barrel and the elongate structure;
  a pulling assembly configured to pull the elongate structure in the longitudinal direction thereof; and
  a branch detection sensor assembly disposed within the interior of the barrel, the branch detection sensor assembly configured to detect a presence of a branch extending from the elongate structure, wherein the detection of the presence of the branch is dependent on a first measured diameter of the elongate structure as sensed by the branch detection sensor assembly, wherein the pulling assembly includes a first grasping mechanism configured to sense a second measured diameter of the elongate structure each time the first grasping mechanism grasps the elongate structure, wherein the detection of the presence of the branch occurs when the first measured diameter is determined to be greater than the second measured diameter.

* * * * *